US011151783B2

(12) United States Patent
Sugimura et al.

(10) Patent No.: US 11,151,783 B2
(45) Date of Patent: *Oct. 19, 2021

(54) IMAGE PICKUP DEVICE, INFORMATION PROCESSING DEVICE, AND IMAGE PICKUP SYSTEM

(71) Applicant: NIKON CORPORATION, Tokyo (JP)

(72) Inventors: Takeaki Sugimura, Tokyo (JP); Yoshihiro Nakagawa, Tokyo (JP); Kazuyuki Kazami, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 380 days.

This patent is subject to a terminal disclaimer.

(21) Appl. No.: 15/445,561

(22) Filed: Feb. 28, 2017

(65) Prior Publication Data
US 2017/0228927 A1 Aug. 10, 2017

Related U.S. Application Data

(63) Continuation of application No. PCT/JP2014/073266, filed on Sep. 3, 2014.

(51) Int. Cl.
G06T 17/10 (2006.01)
G01B 11/24 (2006.01)
H04N 5/232 (2006.01)
G06T 7/70 (2017.01)
G06K 9/46 (2006.01)
(Continued)

(52) U.S. Cl.
CPC .............. *G06T 17/10* (2013.01); *G01B 11/24* (2013.01); *G06K 9/4604* (2013.01); *G06T 7/40* (2013.01); *G06T 7/60* (2013.01); *G06T 7/70* (2017.01); *H04N 5/23206* (2013.01); *H04N 7/181* (2013.01)

(58) Field of Classification Search
CPC ...... G01B 11/24; G06K 9/4604; G06T 17/10; G06T 7/40; G06T 7/60; G06T 7/70; H04N 5/232; H04N 7/181
USPC .......................................... 348/157
See application file for complete search history.

(56) References Cited

U.S. PATENT DOCUMENTS 6,091,420 A 7/2000 Horikawa et al.
7,137,556 B1 11/2006 Bonner et al.
(Continued)

FOREIGN PATENT DOCUMENTS

JP H06-34343 A 2/1994
JP H10-172003 A 6/1998
(Continued)

OTHER PUBLICATIONS

Jan. 2, 2019 Office Action issued in European Patent Application No. 14901137.1.
(Continued)

*Primary Examiner* — Mohammed S Rahaman
(74) *Attorney, Agent, or Firm* — Oliff PLC

(57) ABSTRACT

An imaging device, including: a main body; a detector including: an imager that images an object; and a distance measurer that detects a distance from each point on a surface of the object; an information calculator that is provided in the main body and uses a detection result of the detector to calculate at least one of shape information or texture information on the object; and a communicator that transmits a calculation result of the information calculator.

3 Claims, 18 Drawing Sheets

(51) Int. Cl.
*G06T 7/40* (2017.01)
*G06T 7/60* (2017.01)
*H04N 7/18* (2006.01)

(56) References Cited

U.S. PATENT DOCUMENTS

| | | | |
|---|---|---|---|
| 2002/0080148 | A1 | 6/2002 | Uchino |
| 2003/0038812 | A1 | 2/2003 | Bartell |
| 2003/0235338 | A1 | 12/2003 | Dye |
| 2004/0105573 | A1* | 6/2004 | Neumann ............... G06T 17/00 382/103 |
| 2004/0183940 | A1 | 9/2004 | Raskar |
| 2006/0067573 | A1 | 3/2006 | Parr et al. |
| 2006/0092403 | A1 | 5/2006 | Dralle et al. |
| 2007/0296979 | A1 | 12/2007 | Morimoto et al. |
| 2009/0041364 | A1 | 2/2009 | On |
| 2010/0238182 | A1 | 9/2010 | Geisner et al. |
| 2012/0162220 | A1 | 6/2012 | Sakurai et al. |
| 2012/0257016 | A1 | 10/2012 | Nakajima et al. |
| 2012/0320053 | A1 | 12/2012 | Miyatani |
| 2013/0070068 | A1 | 3/2013 | Garvey, III et al. |
| 2013/0121564 | A1 | 5/2013 | Kitamura et al. |
| 2014/0028799 | A1 | 1/2014 | Kuffner et al. |
| 2014/0037194 | A1* | 2/2014 | Kitamura ............... G01B 11/24 382/154 |
| 2014/0105506 | A1 | 4/2014 | Drost et al. |
| 2014/0225985 | A1* | 8/2014 | Klusza ................. H04N 13/271 348/43 |
| 2014/0286536 | A1* | 9/2014 | Pettersson ............ G01C 15/002 382/106 |
| 2015/0055085 | A1* | 2/2015 | Fonte ..................... G06F 16/22 351/178 |
| 2015/0154782 | A1 | 6/2015 | Geisner et al. |
| 2016/0261793 | A1 | 9/2016 | Sivan |
| 2017/0069125 | A1 | 3/2017 | Geisner et al. |
| 2018/0054604 | A1 | 2/2018 | Boyd et al. |

FOREIGN PATENT DOCUMENTS

| | | | |
|---|---|---|---|
| JP | 2001-043496 | A | 2/2001 |
| JP | 2002-031513 | A | 1/2002 |
| JP | 2002-150315 | A | 5/2002 |
| JP | 2004-191243 | A | 7/2004 |
| JP | 2005-341569 | A | 12/2005 |
| JP | 2006-295582 | A | 10/2006 |
| JP | 2008-002995 | A | 1/2008 |
| JP | 2009-168536 | A | 7/2009 |
| JP | 2010-109783 | A | 5/2010 |
| JP | 2010-134546 | A | 6/2010 |
| JP | 2011-027707 | A | 2/2011 |
| JP | 2012-013660 | A | 1/2012 |
| JP | 2012-142791 | A | 7/2012 |
| JP | 2012-521038 | A | 9/2012 |
| JP | 5022508 | B1 | 9/2012 |
| JP | 2012-221128 | A | 11/2012 |
| JP | 2013-101464 | A | 5/2013 |
| JP | 2014-025935 | A | 2/2014 |
| JP | 2014-132219 | A | 7/2014 |
| JP | 2014-225301 | A | 12/2014 |
| WO | 2010/107575 | A2 | 9/2010 |

OTHER PUBLICATIONS

Nov. 30, 2017 Notification of Reasons for Refusal issued in Japanese patent application 2016-546255.
Feb. 23, 2018 Extended European Search Report issued in European patent application No. 14901137.1.
Dec. 16, 2014 International Search Report issued in International Patent Application No. PCT/JP2014/073266.
Mar. 7, 2017 International Preliminary Report on Patentability issued in International Patent Application No. PCT/JP2014/073266.
Oct. 29, 2019 Office Action issued in Japanese Patent Application No. 2018-242899.
Nov. 18, 2019 Office Action issued in European Patent Application No. 14 901 137.1.
Jul. 7, 2020 Office Action issued in Japanese Patent Application No. 2018-242899.
Mar. 30, 2021 Decision of Refusal issued in Japanese Patent Application No. 2018-242899.
Mar. 30, 2021 Decision of Dismissal of Amendment issued in Japanese Patent Application No. 2018-242899.
May 9, 2017 Search Report issued in International Patent Application No. PCT/JP2017/008165.
May 9, 2017 Written Opinion issued in International Patent Application No. PCT/JP2017/008165.
Barua, Souptik, "Rethinking Image Compression for the Object Detection Task", Rice University, Houston Texas, pp. 1-77, (Oct. 2015).
Salem, Mohammed A-Megeed et al., "Resolution Mosaic-Based Smart Camera for Video Surveillance", IEEE, pp. 978-1-978-7, (2009).
Nov. 12, 2019 Office Action issued in Japanese Patent Application No. 2018-504411.
Sep. 30, 2019 Extended Search Report issued in European Patent Application No. 17763046.4.
May 26, 2020 Office Action issued in Japanese Patent Application No. 2018-504411.
Jul. 24, 2020 Office Action issued in U.S. Appl. No. 16/125,264.
Feb. 3, 2021 Office Action issued in U.S. Appl. No. 16/125,264.
Feb. 23, 2021 Office Action issued in European Patent Application No. 17 763 046.4.
U.S. Appl. No. 16/125,264, filed Sep. 7, 2018 in the name of Nakagawa.
Jun. 30, 2021 Notice of Allowance issued in U.S. Appl. No. 16/125,264.

\* cited by examiner

IMAGE PICKUP DEVICE, INFORMATION PROCESSING DEVICE, AND IMAGE PICKUP SYSTEM

CROSS REFERENCE TO RELATED APPLICATION

This is a Continuation of PCT Application No. PCT/JP2014/073266, filed on Sep. 3, 2014. The contents of the above-mentioned application are incorporated herein by reference.

FIELD OF THE INVENTION

The present invention relates to an imaging device, an information processing device, and an imaging system.

BACKGROUND

A technology of imaging an object with a plurality of imaging devices and inputting the obtained plurality of images to a computer to acquire a three-dimensional shape of the object has been proposed (see, for example, Patent Literature 1).

CITATION LIST

Patent Literature

[Patent Literature 1] Japanese Unexamined Patent Application Publication No. 2010-134546

SUMMARY

Generating a three-dimensional shape of an object from a plurality of images of the object taken by imaging devices, for example, requires to transfer all the images to a computer from the imaging devices and process the images by the computer.

In this case where all the taken images are transferred from the imaging devices to the computer, communication between the imaging devices and the computer (for example, communication processing and communication data volume) may increase.

The present invention has been made in view of the above-mentioned circumstances, and it is an object thereof to provide an imaging device, an information processing device, and an imaging system capable of reducing communication load.

A first aspect of the present invention provides an imaging device, including: a main body; a detector including: an imager that images an object; and a distance measurer that detects a distance from each point on a surface of the object; an information calculator that is provided in the main body and uses a detection result of the detector to calculate at least one of shape information or texture information on the object; and a communicator that transmits a calculation result of the information calculator.

A second aspect of the present invention provides an information processing device that executes rendering processing by using the calculation result transmitted from the communicator in at least one imaging device in the first aspect.

A third aspect of the present invention provides an imaging system, including: at least one imaging device in the first aspect; and an information processing device that executes rendering processing by using the calculation result transmitted from the communicator.

A fourth aspect of the present invention provides an imaging system, including: a plurality of the imaging devices in the first aspect; and an imaging processing device that executes rendering processing by using the calculation result transmitted from the communicator in each of the imaging devices.

A fifth aspect of the present invention provides an imaging system, including: at least one imaging device in the first aspect; and a model integrator that uses the calculation result transmitted from the communicator to generate integrated model information on the object.

A sixth aspect of the present invention provides An imaging system, including: a first imaging device including: a first detector including a first imager that images an object and a first distance measurer that detects a distance from each point on a surface of the object; and a first information calculator that uses a detection result of the first detector to calculate first model information including at least one of shape information or texture information on the object; a second imaging device including: a second detector including a second imager that images the object and a second distance measurer that detects a distance from each point on the surface of the object; and a second information calculator that uses a detection result of the second detector to calculate second model information including at least one of shape information or texture information on the object; and an information processing device including a model integrator that integrates the first model information and the second model information to generate integrated model information on the object.

A seventh aspect of the present invention provides an imaging system, including: a first imaging device including: a first detector including a first imager that images an object and a first distance measurer that detects a distance from each point on a surface of the object; and a first information calculator that uses a detection result of the first detector to calculate first model information including at least one of shape information or texture information on the object, and uses the first model information to generate first feature point data; a second imaging device including: a second detector including a second imager that images the object and a second distance measurer that detects a distance from each point on a surface of the object; a second information calculator that uses a detection result of the second detector to calculate second model information including at least one of shape information or texture information on the object, and uses the second model information to calculate second feature point data; and a model integrator that uses the first feature point data and the second feature point data that are obtained by data communication between the first imaging device and the second imaging device to integrate the first model information and the second model information and generate integrated model information on the object.

The present invention can provide an imaging device, an information processing device, and an imaging system capable of reducing communication load.

DESCRIPTION OF EMBODIMENTS

Detailed Description of Embodiments

First Embodiment

A first embodiment is now described.

Figure 1:
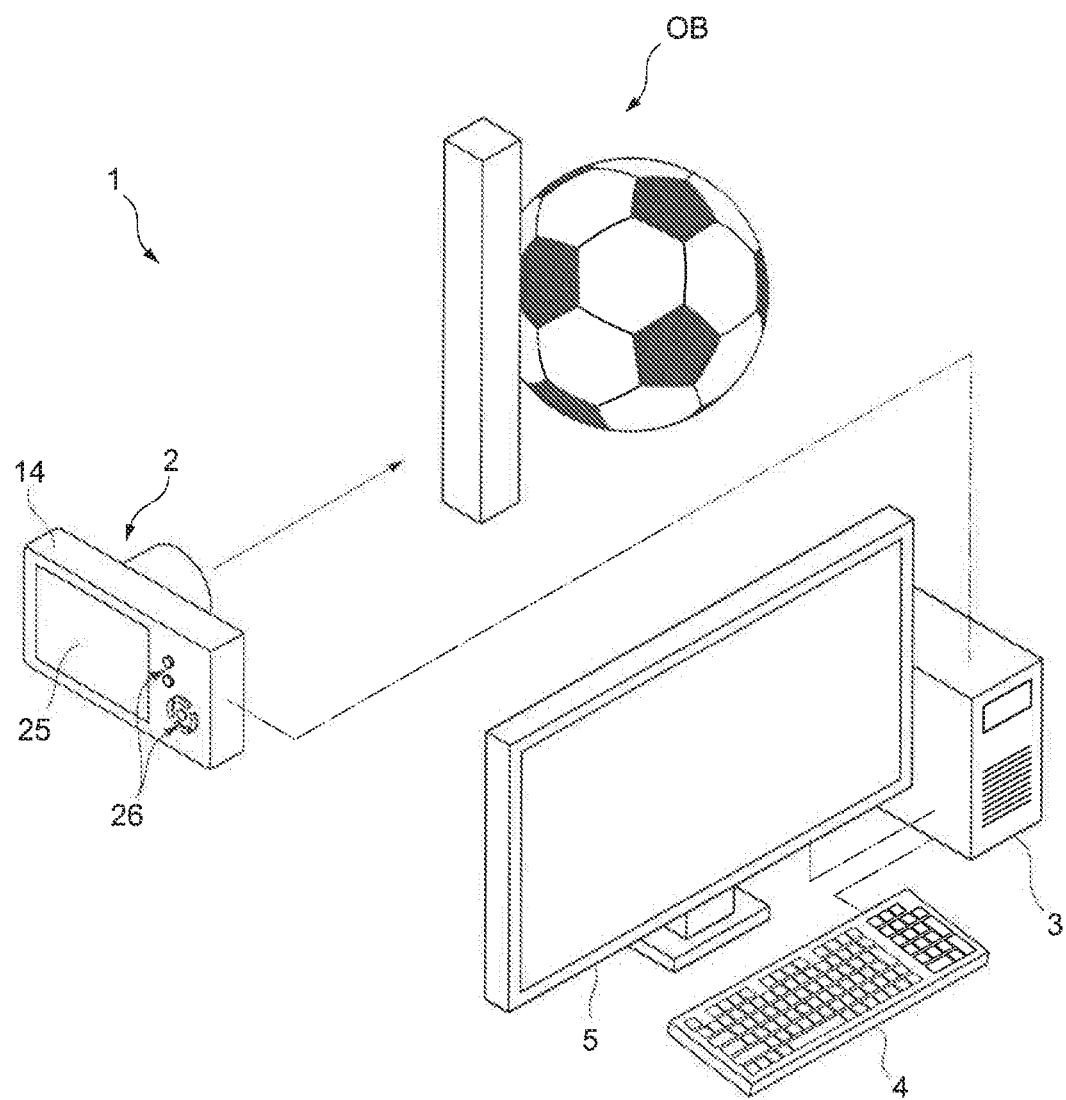
FIG. 1 is a diagram illustrating an imaging system according to a first embodiment.

FIG. 1 is a diagram illustrating an imaging system 1 according to the first embodiment.

For example, the imaging system 1 includes an imaging device 2, an information processing device 3, an input device 4, and a display device 5.

The imaging device 2 images, for example, an object OB illuminated with light from an illumination device, light from an interior lamp, or natural light to acquire data on a taken image (for example, visible light image or infrared light image) of the object OB.

The imaging device 2 detects a distance from the imaging device 2 to each point on the surface of the object OB to acquire depth information on the object OB.

For example, the depth information includes information in which the position of a point on the surface of the object OB is associated with the distance (depth) from the point to the imaging device 2.

Examples of the depth information include information representing a distribution of the depths in the object OB (for example, depth map).

The imaging device 2 uses data on images taken by an imager 15 and depth information detected by a distance measurer (distance detector) 16 to perform calculation processing on information about the object OB.

The imaging device 2 performs calculation processing to model at least a part of the object OB and calculate model information (model data).

For example, the imaging device 2 performs calculation processing to subject at least a part of the object OB to computer graphics processing (CG processing) and calculate model information (for example, CG model data).

The model information includes, for example, at least one of shape information representing a three-dimensional shape of the object OB and texture information representing a pattern of the surface of the object OB.

For another example, the model information includes at least one of three-dimensional point coordinates, information related to the point coordinates, texture information on a surface defined by the point coordinates and the related information, image spatial information such as illumination conditions for the entire image and light source information, or polygon data as shape information.

For example, the object OB in FIG. 1 includes a prismatic member and a soccer ball, and shape information thereof includes information on the surface of the prismatic member (for example, flat) and information on the surface of the soccer ball (for example, sphere).

Texture information on the object OB includes, for example, at least one of information defining characters or graphics (for example, black pentagon or white hexagon), pattern, and unevenness of the surface of the soccer ball, particular images, and color (for example, chromatic color or achromatic color).

For example, the imaging device 2 calculates model information on a part of the object OB that is visible from the imaging device 2 (visual field area, area of field of view).

Examples of the model information include information on a model (hereinafter referred to as "partial model") representing a part of a model representing the whole circumference of the object OB (hereinafter referred to as "whole circumference model").

The imaging device 2 is capable of supplying at least a part of information calculated through calculation processing (for example, model information) to an external device.

For example, the imaging device 2 supplies at least a part of model information to the information processing device 3.

For example, the imaging device 2 is capable of outputting at least a part of the model information to a digital device that is capable of inputting and outputting digital information such as barcodes and two-dimensional codes.

Such a digital device can display or print digital information including at least a part of model information on a display or paper.

A reader device including a reader (for example, optical reader) capable of reading the displayed or printed digital information can input the digital information to a storage area in its own device via the reader.

The reader device may include a rendering processor described later.

The above-mentioned imaging system 1 may include the digital device or the reader device including the reader described above.

The imaging device 2 may include the digital device or the reader device described above.

The information processing device 3 includes, for example, a computer system.

The input device 4 includes, for example, at least one of a keyboard, a mouse, a touch panel, a sensor such as an acceleration sensor, a voice input machine, and a touch pen, and is connected to the information processing device 3.

For example, the input device 4 receives an input of information from a user, and supplies the input information to the information processing device 3.

The display device 5 includes, for example, a liquid crystal display or a touch panel display, and is connected to the information processing device 3.

For example, the display device 5 displays an image by using image data supplied from the information processing device 3.

The information processing device 3 is communicably connected to the imaging device 2 in a wired or wireless manner.

For example, the information processing device 3 may be connected to the imaging device 2 via a communication cable or may be connected to the imaging device 2 via the Internet line.

The information processing device 3 may be communicable to the imaging device 2 by radio waves or infrared rays.

The information processing device 3 acquires information from the imaging device 2 through communication with the imaging device 2.

The information processing device 3 executes rendering processing by using information (for example, model information) acquired from the imaging device 2.

For example, on the basis of setting information on a viewpoint (imaging direction) input to the input device 4 by a user, the information processing device 3 calculates data on an estimated image of the object OB that is viewed from the viewpoint.

For example, the information processing device 3 supplies the estimated image data to the display device 5, and displays the estimated image on the display device 5.

For example, the imaging device 2 extracts information used for rendering processing in the information processing device 3 from the taken image data and the depth information.

Examples of the information extracted by the imaging device 2 include at least a part of model information.

The imaging device 2 supplies the extracted information to the information processing device 3, and hence, for example, as compared with the case of supplying taken image data and depth information to the information processing device 3, the load on communication between the imaging device 2 and the information processing device 3, and the load on processing by the information processing device 3 can be reduced.

For example, the imaging device 2 may be a portable information terminal, a stationary camera, or a camera the field of view of which can be manually or automatically changed.

For example, the imaging system 1 may include a moving device that moves the imaging device 2.

The moving device may move the imaging device 2 to change the field of view of the imaging device 2.

A controller that controls the moving device may be provided in the imaging system 1, or may be provided in, for example, the imaging device 2 or the information processing device 3.

The controller that controls the moving device may be provided in a device outside the imaging system 1.

Next, each unit in the imaging system 1 is described.

Figure 2:
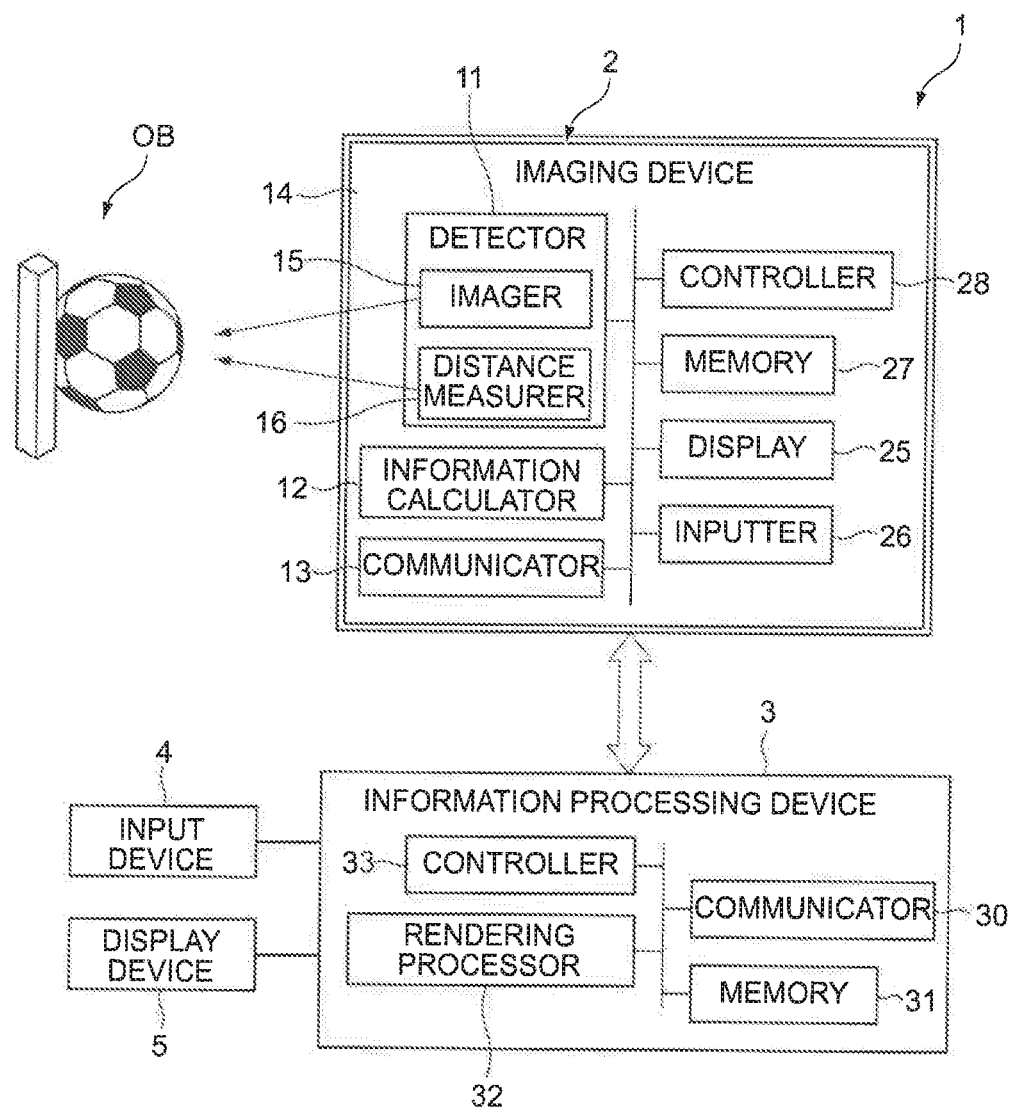
FIG. 2 is a block diagram illustrating the imaging system according to the first embodiment.

FIG. 2 is a block diagram illustrating the imaging system 1 according to the first embodiment.

The imaging device 2 includes a detector 11, an information calculator 12, a communicator 13, and a main body 14.

The main body 14 is, for example, a camera body, a case, or a housing.

The detector 11, the information calculator 12, and the communicator 13 are provided in the main body 14.

The detector 11 includes an imager 15 and a distance measurer 16.

Figure 3A:
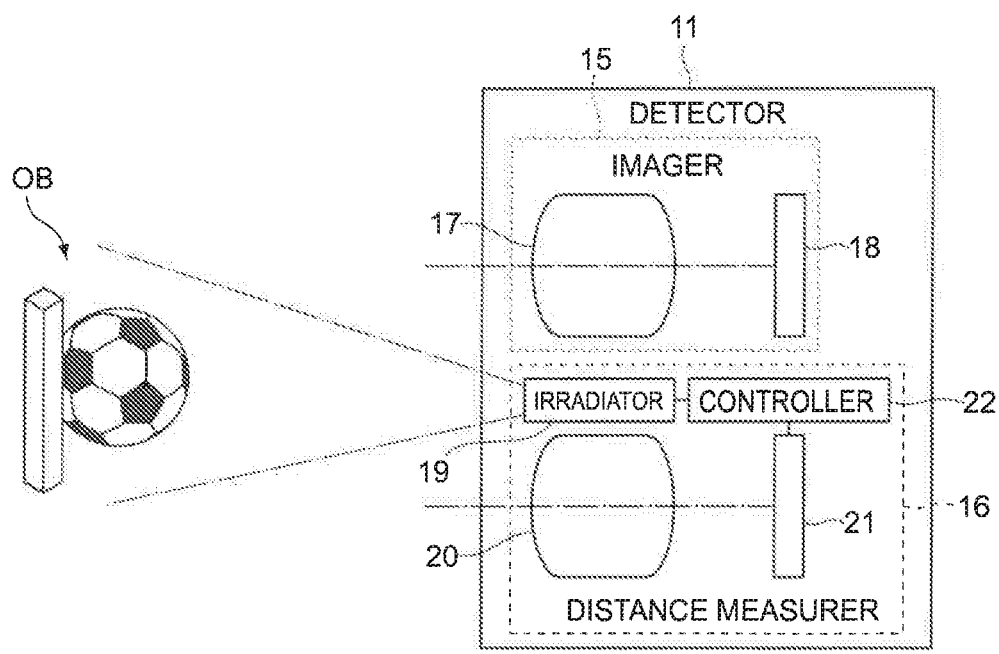
FIGS. 3A and 3B are a diagram illustrating a detector according to the first embodiment.
Figure 3B:
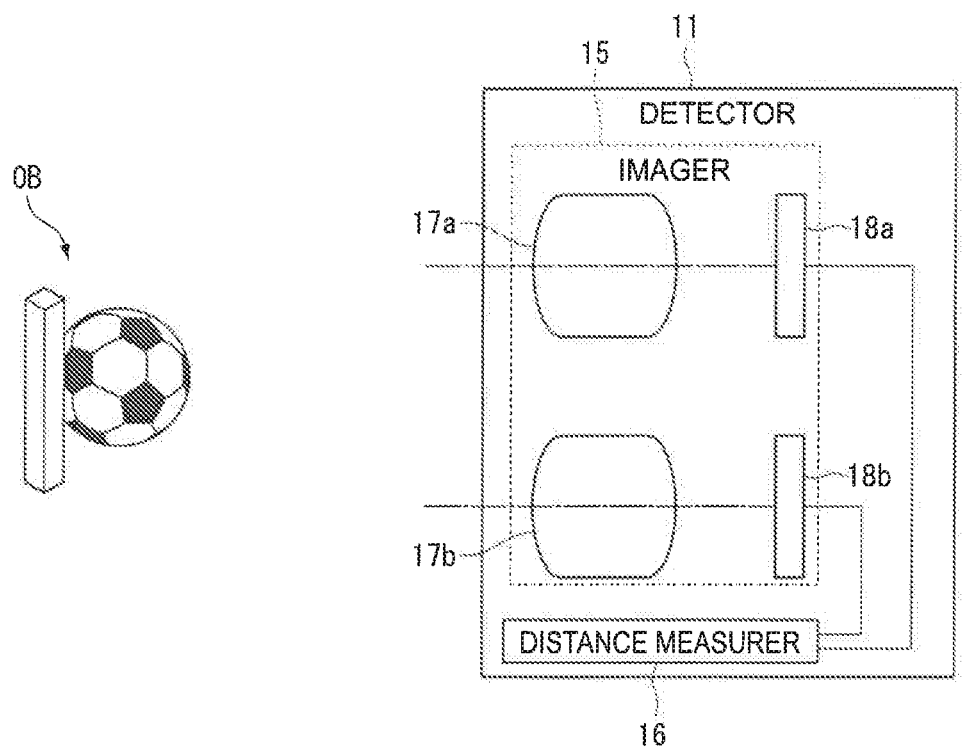

FIGS. 3A and 3B are each a diagram illustrating an example of the detector 11.

The imager 15 includes an imaging optical system 17 and an image sensor 18.

The image sensor 18 is, for example, a CMOS image sensor or a CCD image sensor in which a plurality of pixels are two-dimensionally arrayed.

The image sensor 18 is housed in the main body 14.

For example, the image sensor 18 has sensitivity to a wavelength band of visible light (for example, 380 nm or more and 750 nm or less) or a wavelength band of infrared light.

The imaging result of the image sensor 18 includes, for example, information on gray-scale values of each color of each pixel (for example, RGB data).

For example, the image sensor 18 outputs the imaging result (detection result) in a full-color image data format.

A full-color image is, for example, an image in which each of red (R), green (G), and blue (B) of each pixel is represented by a gray-scale value (for example, 256 levels).

The imaging optical system 17 includes, for example, a plurality of lenses, and forms an image of an object surface (for example, object OB) on the image sensor 18.

For example, the imaging optical system 17 is held in a lens barrel, and is mounted to the main body 14 together with the lens barrel.

The imaging optical system 17 and the lens barrel are, for example, interchangeable lenses, and are detachable from the main body 14.

The lens barrel may be a part of the main body 14, and may be undetachable from the main body 14.

The distance measurer 16 detects the distance from each point on the surface of the object OB.

The distance measurer 16 includes, for example a time of flight (ToF) sensor, and detects the distance by ToF.

The distance measurer 16 includes a phase difference sensor, and detects the distance by phase difference.

The distance measurer 16 includes an irradiator 19, an imaging optical system 20, an image sensor 21, and a controller 22.

The irradiator 19 can irradiate the object OB with infrared light.

The irradiator 19 is controlled by the controller 22.

The controller 22 temporally changes the intensity of infrared light irradiated from the irradiator 19 (for example, amplitude modulation).

The image sensor 21 is, for example, a CMOS image sensor or a CCD image sensor in which a plurality of pixels are two-dimensionally arrayed.

The image sensor 21 is housed in the main body 14.

The imaging optical system 20 includes, for example, a plurality of lenses, and forms an image of an object surface (for example, object OB) on the image sensor 21.

The imaging optical system 20 may be an interchangeable lens or be incorporated in the main body 14.

The image sensor 21 has sensitivity to at least a wavelength band of light irradiated from the irradiator 19.

For example, the image sensor 21 is controlled by the controller 22 to detect infrared light reflected and scattered by the object OB.

The controller 22 uses the detection result detected by the image sensor 21 in the distance measurer 16 to detect the distance from the surface of the object OB to the image sensor 21.

For example, when the depth at a first position is different from the depth at a second position on the surface of the object OB, light reflected and scattered at the first position is different from light reflected and scattered at the second position in a travel distance (optical path) from the object OB to the image sensor 21.

Thus, the light reflected and scattered at the first position on the object OB is different from the light reflected and scattered at the second position in the phase of entering the image sensor 21.

The controller 22 temporally modulates the intensity of light irradiated from the irradiator 19, and hence the intensity of light entering the image sensor 21 changes depending on the phase.

For example, the controller 22 calculates the depth on the basis of the temporal change of the output of the image sensor 21.

For example, the controller 22 calculates the depth on the basis of the distance between the image sensor 21 and the surface of the object OB for each partial area (for example, one pixel or a plurality of pixels) of an image taken by the image sensor 21, and associates the calculated depth (or distance) with the position of the partial area.

In this manner, for example, the controller 22 calculates information including each depth in a plurality of partial areas.

The irradiator 19 may irradiate light including visible light, and the image sensor 21 may detect light reflected and scattered by the object OB.

For example, the distance measurer 16 may detect the object OB with the image sensor 21 in the state in which the object OB is illuminated with light and the state in which the object OB is not applied with light, and calculate depth information by using the difference between detection results in the two states.

The distance measurer 16 may include a projector camera.

In this case, for example, the image sensor 21 detects the object OB while the distance measurer 16 irradiates the object OB with light (for example, patterned light, structured light, or texture) having a predetermined intensity distribution from the irradiator 19.

The controller 22 uses the intensity distribution of light on the object OB appearing in the image taken by the image sensor 21 to detect the distance between the object OB and the distance measurer 16.

The distance measurer 16 may include a laser scanner.

In this case, the distance measurer 16 irradiates the object OB with laser light from the irradiator 19 to scan the object OB with the laser light, and detects the laser light reflected by the object OB, thereby detecting the distance between the object OB and the distance measurer 16.

FIG. 3B is a diagram illustrating another example of the detector 11.

A distance measurer 16 in this detector 11 detects a distance between the object OB and the detector 11 by using detection results obtained by detecting the object OB from a plurality of field of views.

The imager 15 includes an imaging optical system 17a and an image sensor 18a as well as an imaging optical system 17b and an image sensor 18b.

The imaging optical system 17a and the image sensor 18a image the object OB in a first field of view.

The imaging optical system 17b and the image sensor 18b image the object OB in a second field of view.

The second field of view is different from the first field of view in at least one of the position of the viewpoint or the direction of the line of sight.

Examples of the position of the viewpoint include the position at which an image of the object is formed, such as the position of the image sensor 18a and the position of the image sensor 18b.

Examples of the direction of the line of sight include the direction parallel to the direction of an optical axis of an optical member that is disposed closest to the object among optical members through which light travels to the viewpoint.

For example, the direction of the line of sight in the first field of view is coaxial with the exit-side optical axis of the imaging optical system 17a.

The direction of the line of sight in the second field of view is coaxial with the exit-side optical axis of the imaging optical system 17b.

The distance measurer 16 detects the distance between the object OB and the detector 11 by using an image taken by the image sensor 18a and an image taken by the image sensor 18b as parallax images.

The imager 15 may use one image sensor to take an image from a first field of view and an image from a second field of view at different times, and the distance measurer 16 may use these images to detect the distance between the object OB and the detector 11.

The distance measurer 16 may detect the distance expressed by a dimensional value such as meters, or detect a relative distance expressed by a dimensionless value normalized by a standard value.

For example, the distance measurer 16 may be in the form of a unit or be externally connected to the outside of the main body 14.

At least a part of the optical systems included in the distance measurer 16 may be shared with at least a part of the optical systems included in the imager 15.

For example, in FIG. 3A, the distance measurer 16 may be configured such that infrared light in light passing through the imaging optical system 17 is branched by a dichroic mirror and the branched infrared light is detected by the image sensor 21.

A projector camera may be configured such that the irradiator 19 projects a pattern on the object OB via the imaging optical system 17.

Referring back to FIG. 2, the information calculator 12 includes, for example, a digital signal processor (DSP).

The information calculator 12 uses the detection result of the detector 11 to calculate at least one of shape information or texture information on the object OB.

As the shape information, the information calculator 12 calculates coordinates of a plurality of points (hereinafter referred to as "point group data") on the surface of the object OB and surface information including link information between the points.

Examples of the surface information include polygon data, vector data, and draw data.

The link information includes, for example, information that associates points on both ends of a line corresponding to a ridge line (for example, edge) of the object OB with each other and information that associates a plurality of lines corresponding to the contour of a plane of the object OB with each other.

First, the information calculator 12 uses the detection result (for example, depth information) of the distance measurer 16 to calculate point group data (point group data processing).

For example, the information calculator 12 calculates the point group data through perspective transformation from a distance image represented by the depth information to a planar image.

In the case where the imager 15 and the distance measurer 16 have different field of views from each other, for example, the information calculator 12 may transform the detection result of the distance measurer 16 into the result of detecting the object OB from the field of view of the imager 15 through perspective transformation (projective transformation).

For example, the information calculator 12 may execute the perspective transformation by using a parameter that depends on the positional relation between the field of view of the imager 15 and the field of view of the distance measurer 16 (for example, position of viewpoint or direction of line of sight).

For example, the information calculator 12 estimates a plane between a point selected from among the points included in the point group data and a point in the vicinity thereof, and transforms the point group data into polygon data having plane information between points (surface processing).

For example, the information calculator 12 transforms the point group data into polygon data by an algorithm using the least-square method.

For example, an algorithm published in a point group processing library may be applied as the algorithm.

Next, the information calculator 12 calculates texture information by, for example, inverse rendering.

The texture information includes, for example, information on at least one item of pattern information representing a pattern of the surface of the object OB, light source information on light irradiated to the object OB, or optical characteristics information representing optical characteristics (for example, reflectivity and scattering rate) of the surface of the object OB.

The light source information includes, for example, information on at least one item of the position of a light source, the direction of light irradiation from the light source to the object, the wavelength of light irradiated from the light source, or the type of light source.

For example, the information calculator 12 calculates light source information by using a model that assumes Lambertian reflectance or a model including Albedo estimation.

For example, the information calculator 12 estimates, among pixel values of pixels in an image taken by the imager 15, a component derived from light diffused by the object OB and a component normally reflected by the object OB.

For example, the information calculator 12 uses the result of estimating the component normally reflected by the object OB and the shape information to calculate the direction in which light enters the object OB from the light source.

For example, the information calculator 12 uses the calculated light source information and shape information to estimate reflection characteristics of the object OB, and calculates optical characteristics information including the estimation result of the reflection characteristics.

For example, the information calculator 12 uses the calculated light source information and optical characteristics information to remove the influence of illumination light from visible light image data, and calculates pattern information.

The imaging device 2 according to the first embodiment further includes a display 25, an inputter 26, a memory 27, and a controller 28.

The display 25 (see FIG. 1) is, for example, a liquid crystal display or a touch panel display provided to the main body 14.

For example, the display 25 displays at least a part of detection results of the detector 11 (for example, visible light image by imager 15), calculation results of the information calculator 12 (for example, depth map), and various kinds of setting information.

The inputter 26 is, for example, an operation button provided to the main body 14, a touch panel provided to the display 25, or a voice input machine that recognizes voice of a user.

For example, the inputter 26 detects an operation by a user, and receives an input of information from the user.

The inputter 26 transmits the input information to the controller 28.

The memory 27 is, for example, a non-volatile memory such as a USB memory and a memory card, and stores various kinds of information therein.

The memory 27 may include a storage device incorporated in the imaging device 2, and may include a port to which a storage device releasable from the imaging device 2 can be connected.

The information calculator 12 in the imaging device 2 according to the first embodiment generates model information obtained by adding header information (for example, identification information such as number and code) to information including at least one of shape information or texture information.

The communicator 13 transmits the model information.

The header information includes at least one of identification information, the position of the imaging device 2 (position information), imaging timing by the imager 15, imaging time by the imager 15, optical characteristics information on the object OB, or imaging environmental information (for example, light source information and illumination conditions for the object OB).

In this manner, the information calculator 12 in the imaging device 2 is capable of generating model information having header information on the basis of a predetermined data format, and transmitting the model information by using the communicator 13.

For example, the controller 28 controls each unit in the imaging device 2 by using an instruction (control signal) from a user or an external device (for example, an information processing device 3).

For example, the controller 28 controls the detector 11 to execute the above-mentioned detection processing.

The detection processing includes, for example, imaging processing by the imager 15 and distance detection processing by the distance measurer 16.

For example, the controller 28 stores at least a part of detection results of the detector 11 in the memory 27.

For example, the controller 28 controls the information calculator 12 to calculate model information.

For example, the controller 28 stores at least a part of the model information calculated by the information calculator 12 in the memory 27.

For example, the memory 27 stores the model information therein for each item.

For example, the memory 27 stores therein information on each item of shape information, texture information, light source information, optical characteristics information on the object OB, and pattern information in individual data tables.

For example, the controller 28 displays an image representing at least a part of the information stored in the memory 27 on the display 25.

The controller 28 controls the communicator 13 to transmit and receive information via the communicator 13.

For example, the communicator 13 includes at least one of an I/O port such as a USB port or a communication device that performs wireless communication by radio waves or infrared rays.

The communicator 13 is controlled by the controller 28 to read information stored in the memory 27 and transmit the read information to an external device.

For example, the communicator 13 transmits at least a part of the calculation results of the information calculator 12 (for example, model information) to the information processing device 3.

For example, the communicator 13 receives information including an instruction from an external device.

The communicator 13 is capable of storing the received information in the memory 27 and supplying the received information to the controller 28.

In the case where the imaging device 2 includes the above-mentioned digital device, the communicator 13 may transmit at least a part of the model information to the digital device.

The digital device may generate digital information on the basis of the received model information and output the digital information to media such as paper.

As illustrated in FIG. 2, the information processing device 3 includes a communicator 30, a memory 31, a rendering processor 32, and a controller 33.

For example, the communicator 30 includes at least one of a USB port, a network card, or a communication device that performs wireless communication by radio waves or infrared rays.

The communicator 30 is communicable with the communicator 13 in the imaging device 2.

For example, the memory 31 includes a removable storage medium such as a USB memory, or an external or built-in large-capacity storage device such as a hard disk.

For example, the memory 31 stores therein data on at least a part of information received via the communicator 30, an imaging control program for controlling the imaging device 2, and a processing program for executing each processing in the information processing device 3.

The rendering processor 32 includes, for example, a graphics processing unit (GPU).

The rendering processor 32 may be configured such that a CPU and a memory execute each processing in accordance with an image processing program.

For example, the rendering processor 32 executes at least one of drawing processing, texture mapping processing, or shading processing.

In the drawing processing, for example, the rendering processor 32 can calculate an estimated image (for example, reconstructed image) in which the shape defined by shape information in model information is viewed from a freely selected viewpoint.

In the following description, the shape represented by shape information is referred to as "model shape".

For example, the rendering processor 32 can reconstruct a model shape (for example, estimated image) from model information (for example, shape information) through the drawing processing.

For example, the rendering processor 32 stores data on the calculated estimated image in the memory 31.

The imaging device 2 is capable of transmitting at least a part of the model information to the information processing device 3, and hence, for example, the information processing device 3 can reduce load on the rendering processing.

For example, the imaging device 2 does not need to transmit all images taken by the imager 15 to the information processing device 3, but transmits at least a part of the model information (for example, shape information and texture information) calculated by the information calculator 12 to the information processing device 3.

Consequently, the imaging device according to the first embodiment can reduce communication load on information necessary for drawing processing of the rendering processor 32.

In the texture mapping processing, for example, the rendering processor 32 can calculate an estimated image obtained by attaching an image representing texture information in model information to the surface of the object on the estimated image.

The rendering processor 32 can also calculate an estimated image obtained by attaching another texture than the object OB on the surface of the object on the estimated image.

In the shading processing, for example, the rendering processor 32 can calculate an estimated image in which the shade formed by a light source represented by light source information in model information is added to the object on the estimated image.

In the shading processing, for example, the rendering processor 32 can calculate an estimated image in which the shade formed by a freely selected light source is added to the object on the estimated image.

For example, the controller 33 controls each unit in the information processing device 3, the imaging device 2, the input device 4, and the display device 5.

For example, the controller 33 controls the communicator 30 to transmit an instruction (control signal) and setting information to the imaging device 2.

For example, the controller 33 stores information received by the communicator 30 from the imaging device 2 in the memory 31.

For example, the controller 33 controls the rendering processor 32 to execute rendering processing.

For example, the controller 33 controls the imaging device 2 by transmitting an instruction (signal) to the imaging device 2 via the communicator 30.

For example, the controller 33 controls the communicator 30 to transmit, to the imaging device 2, an instruction (request signal) that requests transmission of predetermined information.

The controller 33 may transmit an instruction that instructs the imaging device 2 to execute each processing to the imaging device 2.

For example, the controller 33 may transmit an instruction that instructs the detector 11 in the imaging device 2 to execute detection processing to the imaging device 2.

For example, the controller 33 may transmit an instruction that instructs the information calculator 12 in the imaging device 2 to execute processing of calculating model information to the imaging device 2.

The controller 33 in the information processing device 3 may transmit an instruction that instructs the imager 15 in the imaging device 2 to execute imaging of the object OB and an instruction that instructs the imager 15 in the imaging device 2 to set imaging conditions for the object OB to the imaging device 2.

For example, the communicator 13 transmits information calculated by the information calculator 12 selectively for each item.

For example, the setting information stored in the memory 27 includes transmission item information that defines whether to transmit information on each item in the model information and transmission order information that defines the order of transmitting information on each item.

For example, the setting information can be updated by operation of the inputter 26 or an instruction from the information processing device 3.

For example, the controller 28 controls the communicator 13 to transmit information on items determined by transmission item information in the order determined by transmission order information.

For example, the controller 28 may control the communicator 13 to transmit information on items determined by transmission item information (for example, shape information and texture information) at a time on the basis of a predetermined data format.

For example, the transmission item information may be set setting in accordance with whether corresponding information is used for rendering processing by the information processing device 3.

For example, in some cases, the rendering processing involves combining the shape of the object OB with texture different from the object OB.

In this case, for example, the information processing device 3 can execute rendering processing by using the shape information on the object OB without using the texture information on the object OB.

For example, the transmission item information is set as information that defines that the shape information is transmitted but the texture information is not transmitted.

In this case, the information calculator 12 does not need to calculate texture information.

For example, the rendering processing may involve calculating an image in which illumination on the object OB is changed.

For example, the information processing device 3 can execute rendering processing by using shape information, pattern information, and optical characteristics information on the object OB and not using light source information.

In this case, for example, transmission item information is set as information that defines that the shape information, the pattern information, and the optical characteristics information are transmitted but the light source information is not transmitted.

For example, the transmission item information is set as information that defines that at least one type of information of the shape information, the texture information, the pattern information, the light source information, or the optical characteristics information is transmitted.

The imaging device 2 can reduce the communication load when a part of the model information is transmitted, for example.

For example, the transmission order information may be set depending on the priority order in the rendering processing by the information processing device 3.

For example, the transmission order information may be set such that information on an item that used first in the rendering processing is transmitted first.

For example, in some cases, the rendering processing involves calculating an image of an object OB having no texture while changing viewpoints and after determining the viewpoint, calculating an image of an object OB having texture viewed from the viewpoint.

For example, the information processing device 3 can calculate an image of the object OB having no texture while changing the viewpoint by using the shape information without using the texture information.

For example, the transmission item information is set as information that defines that the shape information is transmitted first and the texture information is transmitted after the shape information.

For example, in the case where information on each item in the model information is transmitted in the order corresponding to the priority order in the rendering processing by the information processing device 3, the imaging device 2 can transmit the information in parallel to a part of the rendering processing by the information processing device 3.

For example, the controller 28 in the imaging device 2 can concurrently execute at least a part of the calculation of model information by the information calculator 12 and the information transmission processing by the communicator 13.

For example, the controller 33 in the information processing device 3 stores information input to the input device 4 in the memory 31.

The information input to the input device 4 includes, for example, setting information on the rendering processing.

The setting information includes, for example, at least one of data subjected to drawing processing (for example, shape information in model information), information on the viewpoint in the drawing processing, data on an object to which texture is attached in the texture mapping processing, information (for example, texture information in model information) on texture attached to the object in the texture mapping processing, or information (for example, light source information in model information) on a light source in the shading processing.

For example, the rendering processor 32 executes rendering processing in accordance with the setting information.

For example, the controller 33 displays an image representing various kinds of information stored in the memory 31 on the display device 5.

For example, the controller 33 displays setting information on the rendering processing on the display device 5, and receives a change of the setting information by the input device 4.

The controller 33 displays an image represented by estimated image data stored in the memory 31 on the display device 5.

The information processing device 3 is not necessarily required to display an estimated image obtained by rendering processing on the display device 5, and in this case, the imaging system 1 does not need to include the display device 5.

For example, the information processing device 3 may transmit at least a part of estimated image data calculated through rendering processing to another device (reproduction device) via the communicator 30, and the other device may display the image.

For example, the information processing device 3 may transmit estimated image data to the communicator 13 in the imaging device 2 via the communicator 30, and the imaging device 2 may display an estimated image on the display 25 on the basis of the estimated image data received via the communicator 13.

For example, the reproduction device acquires information (estimated image) calculated through rendering processing, and displays the information on the display.

The information processing device 3 may receive various kinds of setting information from another device via the communicator 30, and in this case, the imaging system 1 does not need to include the input device 4.

For example, the imaging device 2 may transmit rendering processing setting information (for example, information on viewpoint based on which estimated image is calculated) to the communicator 30 in the information processing device 3 via the communicator 13.

The information processing device 3 may execute rendering processing in accordance with the rendering processing setting information received from the imaging device 2.

The imaging device 2 may transmit an instruction that requests estimated image data calculated through rendering processing to the communicator 30 in the information processing device 3 via the communicator 13.

The information processing device 3 may transmit estimated image data to the communicator 13 in the imaging device 2 via the communicator 30 as a response to the instruction from the imaging device 2.

The imaging device 2 may transmit the above-mentioned request instruction as a part of setting information for rendering processing or as another instruction (for example, control signal) than the setting information for rendering processing.

In the case where the imaging device 2 is controlled by the information processing device 3 to execute the above-mentioned various kinds of processing, the imaging device 2 does not need to include at least a part of the controller 28, the memory 27, the display 25, or the inputter 26.

For example, the imaging device 2 may execute various kinds of processing described above in response to user's operation, and does not need to be controlled by the information processing device 3.

For example, the imaging device 2 may execute various kinds of processing described above without receiving any instruction (control signal) from an external device, and may execute various kinds of processing described above in response to user's operation or in accordance with a predetermined processing schedule.

The imaging device 2 may transmit calculation results of the information calculator 12 (for example, model information) to another device in the information processing device 3 via the communicator 13.

Next, an image processing method is described on the basis of the operation of the imaging system 1.

Figure 4:
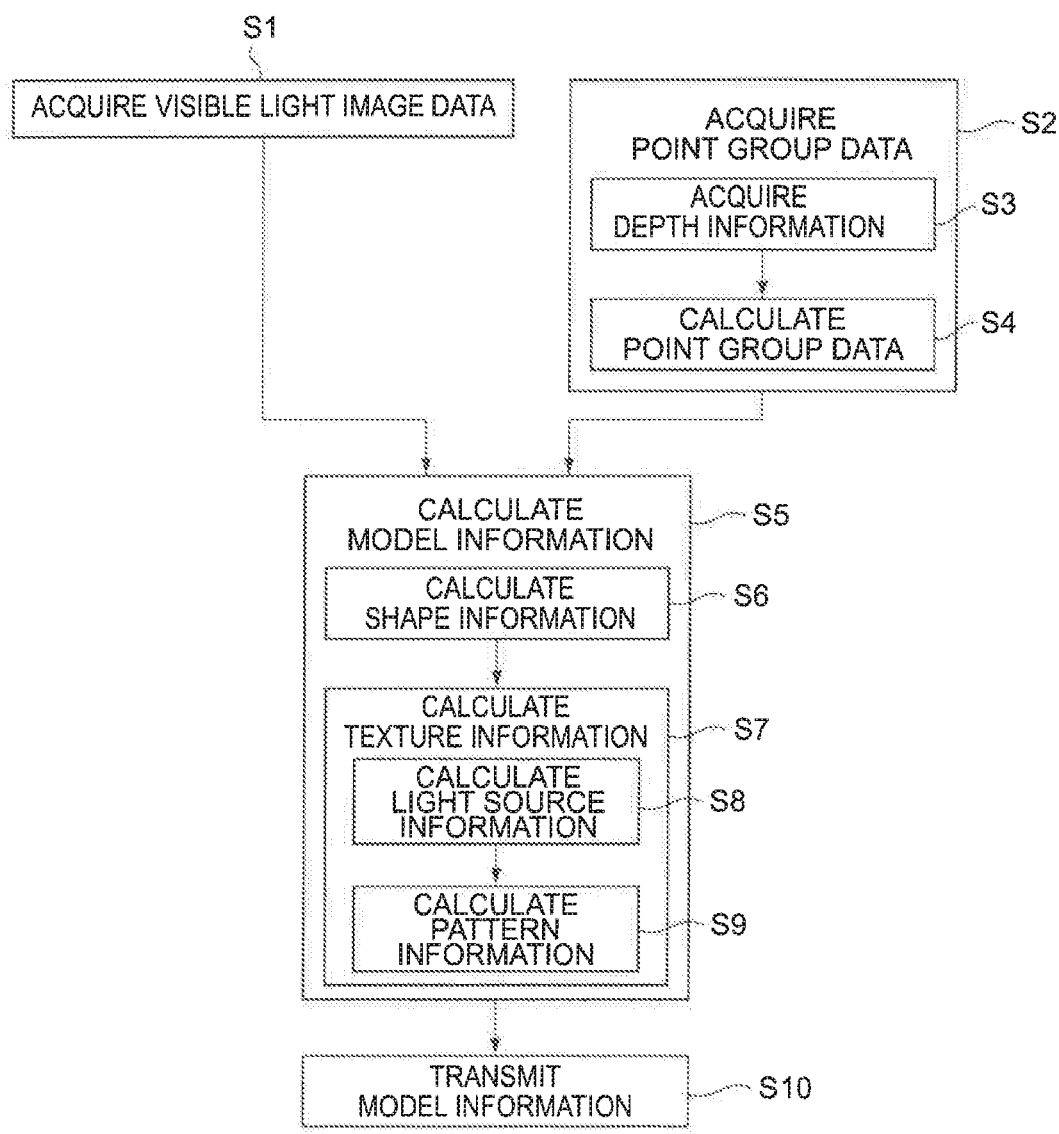
FIG. 4 is a diagram illustrating an operation of the imaging system according to the first embodiment.

FIG. 4 is a flowchart illustrating the operation of the imaging system 1.

In Step S1 in FIG. 4, the imaging device 2 images an object OB with the imager 15, and acquires data on the taken image (for example visible light image) (imaging processing).

In Step S2, the imaging device 2 acquires point group data representing a three-dimensional shape of the surface of the object OB (point group data processing).

In Step S2, the imaging device 2 detects the distance between the object OB and the imaging device 2 with the distance measurer 16 to acquire depth information (Step S3).

For example, the information calculator 12 in the imaging device 2 calculates point group data through perspective transformation of the depth information (Step S4).

In Step S4, for example, the information calculator 12 adjusts a parallax between the visible light image data and the depth information as necessary (viewpoint transformation processing).

The information calculator 12 may execute the processing in Step S2 in parallel to at least a part of the processing in Step S1, or may execute the processing in Step S2 before the start of the processing in Step S1 or after the end of the processing in Step S1.

In Step S5, the information calculator 12 calculates (generates) model information (model information generation processing).

For example, the information calculator 12 calculates surface information as shape information (Step S6) (surface processing).

For example, the information calculator 12 uses the calculated surface information to calculate texture information by inverse rendering (Step S7).

In Step S7, the information calculator 12 calculates light source information (Step S8).

For example, the information calculator 12 uses the calculated light source information to calculate pattern information (Step S9).

In Step S5, the information calculator 12 stores the calculated information in the memory 27 for each item.

In Step S10, the imaging device 2 transmits at least a part of the model information stored in the memory 27 to the information processing device 3 via the communicator 13.

For example, the information processing device 3 uses the model information received from the imaging device 2 to execute rendering processing, and displays the result of the rendering processing (for example, estimated image) on the display device 5.

Second Embodiment

Next, a second embodiment is described.

In the second embodiment, the same configurations as those in the above-mentioned embodiment are denoted by the same reference symbols and descriptions thereof are simplified or omitted.

Figure 5:
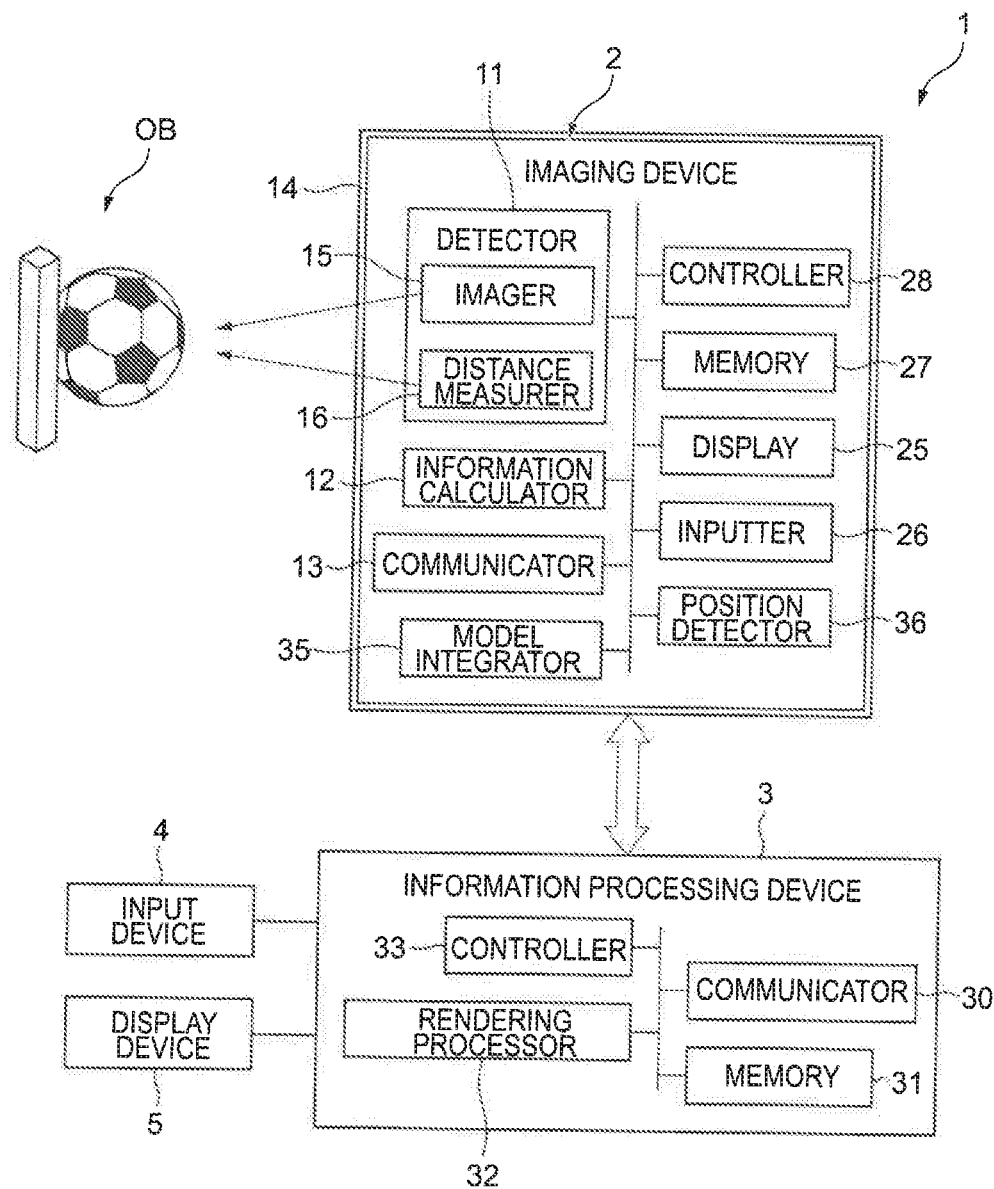
FIG. 5 is a block diagram illustrating an imaging system according to a second embodiment.

FIG. 5 is a diagram illustrating an imaging system 1 according to the second embodiment.

An imaging device 2 according to the second embodiment includes a model integrator 35 and a position detector 36.

The model integrator 35 in the imaging device 2 integrates first model information calculated on the basis of the result (first detection result) of detecting the object OB from the first direction and second model information calculated on the basis of the result (second detection result) of detecting the object OB from the second direction to generate integrated model information.

In the second embodiment, the information calculator 12 uses the above-mentioned technology to calculate each of the first model information and the second model information.

For example, the model integrator 35 integrates the first model information and the second model information in a manner that a first feature point in the shape represented by the first model information and a second feature point in the shape represented by the second model information are associated with each other.

The first feature point is a part of the shape represented by the first model information that can be distinguished from other parts.

For example, a part defined as a plane in the surface information can be distinguished from other planes on the basis of the shape of its outer circumference.

The second feature point is a part of the shape represented by the second model information that can be distinguished from other parts.

For example, the model integrator 35 uses at least one of shape information or texture information included in the first model information to detect a first feature point, and calculates first feature point data representing the position of the first feature point and a feature amount (first feature amount) at the feature point.

For example, the model integrator 35 stores the first feature point data in the memory 27 as information on one item in the first model information.

For example, the model integrator 35 uses at least one of shape information or texture information included in the second model information to detect a second feature point, and calculates second feature point data representing the position of the second feature point and a feature amount (second feature amount) at the feature point.

For example, the model integrator 35 stores the second feature point data in the memory 27 as information on one item in the second model information.

For example, the model integrator 35 calculates the feature point and the feature amount by scale-invariant feature transform (SIFT) or speeded up robust features (SURF).

For example, the above-mentioned feature point data (for example, first feature point data and second feature point data) is data including at least a feature amount at a feature point, and may be data including only a feature amount among the feature point and the feature amount.

The model integrator 35 calculates integrated model information representing third feature point data obtained by matching and integrating the first feature point data having the first feature amount in the first model information and the second feature point data having the second feature amount in the second model information.

Examples of the third feature point data include data obtained by matching first feature point data (for example, first feature amount) and second feature point data (for example, second feature amount).

For example, the third feature point data is integrated data obtained by modeling a range of the object OB that includes a part where the first feature point data and the second feature point data overlap with each other and is wider than each of the first part shape and the second part shape.

For example, in the case where the imaging device 2 detects the object OB from one side in a freely selected first direction to calculate first model information, and detects object OB from the other side in the first direction to calculate second model information, the model integrator 35 calculates integrated model information that covers almost the entire circumference of the object OB.

The shape represented by the integrated model information may be a partial model representing a part of the object OB.

The integrated model information includes, for example, at least one of shape information or texture information.

Examples of the shape information in the integrated model information include information obtained by integrating shape information in first model information and shape information in second model information.

Examples of the texture information in the integrated model information include information obtained by integrating texture information in first model information and texture information in the second model information.

For example, the position detector 36 detects position information on the imaging device 2 (for example, detector 11) in response to an instruction (detection request signal) from the controller 28.

For example, the position detector 36 includes at least one of an orientation sensor, a GPS sensor, or an acceleration sensor.

For example, the position detector 36 is provided inside the main body 14, but may be externally connected to the main body 14.

The position detector 36 may be a unit that is detachable from the main body 14.

For example, the position information on the detector 11 includes at least one of the detection direction of the detector 11 or the global positioning information.

Examples of the detection direction of the detector 11 include the direction of an optical axis of the imaging optical system 17 in the imager 15 illustrated in FIG. 3A.

For example, the detection direction of the detector 11 is determined in advance for each posture of the imaging device 2, and the position detector 36 detects the posture of the imaging device 2 with an orientation sensor, thereby detecting the detection direction of the detector 11.

For example, the detector 11 detects global positioning information with a GPS sensor.

The position information on the detector 11 includes the change amount of the position of the detector 11.

For example, the position detector 36 can integrate the detection result of the acceleration sensor with respect to time to detect the velocity of the detector 11.

For example, the position detector 36 integrates the velocity of the detector 11 with respect to time to detect the change amount of the position of the detector 11.

For example, the detector 11 may detect position information with first accuracy with the GPS sensor, and use the detection result of the acceleration sensor to acquire position information with second accuracy higher than the first accuracy.

For detecting the object OB by the detector 11, for example, the controller 28 controls the position detector 36 to detect position information on the detector 11.

For example, the controller 28 stores the detection result of the detector 11 in the memory 27 in association with the detection result of the position detector 36 (position information on detector 11).

The information calculator 12 calculates model information on the basis of the detection result of the object OB by the detector 11, and stores information on each item in the model information in the memory 27 in association with the position information on the detector 11.

For example, the model information may include position information on the detector 11.

For example, the position information on the detector 11 is used for integration of first model information and second model information.

For example, the model integrator 35 may use first position information on the detector 11 obtained when the detector 11 detects the original data of the first model information and second position information on the detector 11 obtained when the detector 11 detects the original data of the second model information to match and integrate the first model information and the second model information.

For example, the model integrator 35 may use the first position information and the second position information to calculate the positional relation between a first part shape represented by the first model information and a second part shape represented by the second model information.

In the case where the above-mentioned position information is used for integration of model information, the imaging device 2 or the information processing device 3 that executes integration can reduce the calculation amount necessary for integration and reduce mismatch in integration.

The model integrator 35 may integrate the first model information and the second model information by using the position information on the detector 11 and the feature point data including the feature amount.

The model integrator 35 may integrate the first model information and the second model information by using the position information on the detector 11 without using the feature point data.

For example, the model integrator 35 may integrate the first model information and the second model information by using the feature point data (for example, feature amount) without using the position information on the detector 11.

An area (hereinafter referred to as "outside area of field of view") adjacent to an end portion of the shape represented by shape information in first model information includes, for example, an area that cannot be detected from the first direction.

For example, the outside area of field of view is a non-closed part of the shape represented by the first model information.

The information calculator 12 or the model integrator 35 may calculate the detection direction of the detector 11 that can acquire shape information in the outside area of field of view.

The imaging device 2 may display the detection direction on the display 25 as a candidate for the second direction, for example, after the detection processing of the object OB from the first direction is finished.

Next, an image processing method is described on the basis of the operation of the imaging system 1.

Figure 6:
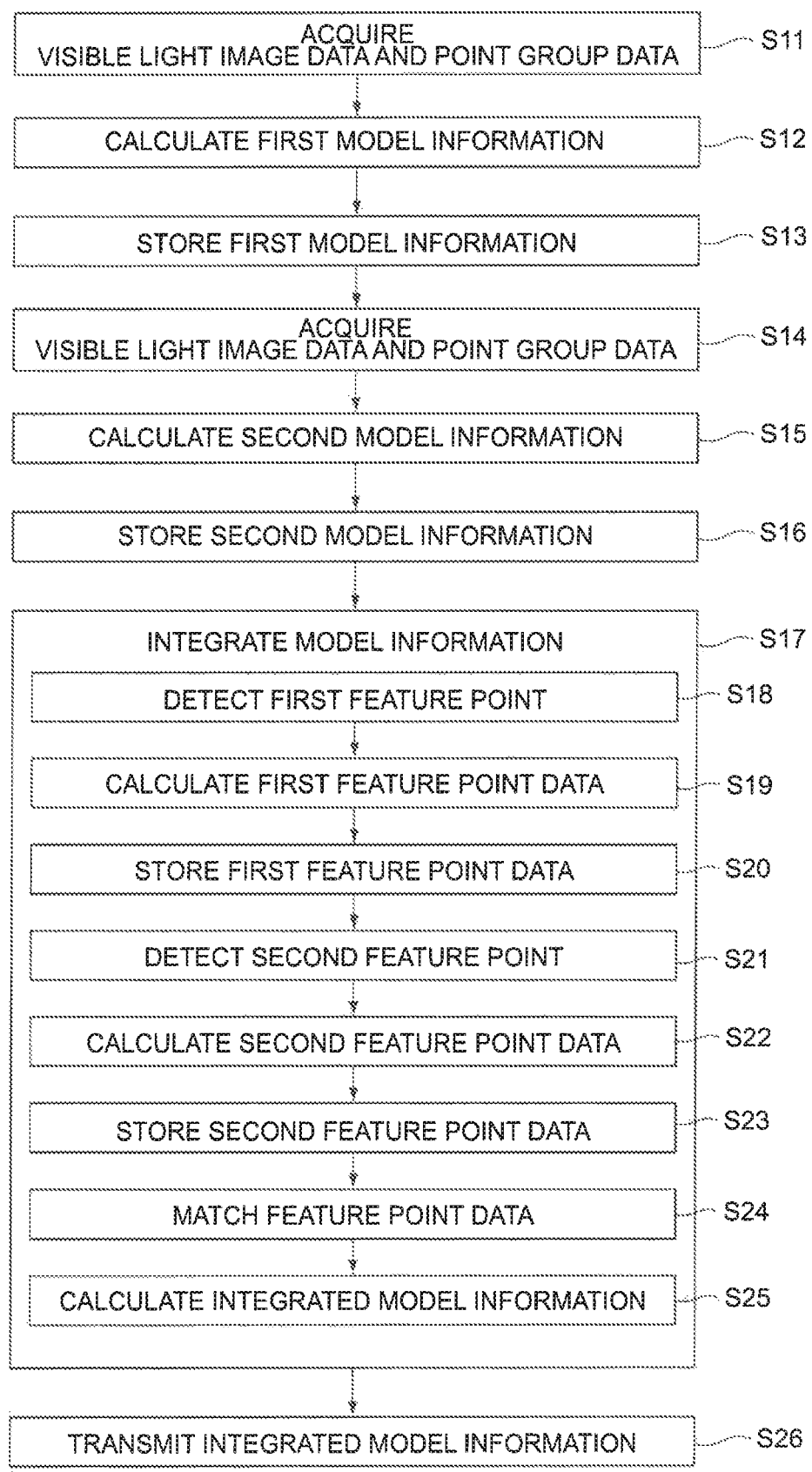
FIG. 6 is a diagram illustrating operation of the imaging system according to the second embodiment.

FIG. 6 is a flowchart illustrating the operation of the imaging system 1.

The imaging device 2 performs processing of Step S11 for acquiring at least taken image data under the state in which the detection direction of the detector 11 is set to the first direction.

In Step S11, the imaging device 2 detects the object OB with the detector 11 from the first direction, and acquires, for example, visible light image data and point group data.

In Step S12, the information calculator 12 uses the detection result of the detector 11 in Step S11 to calculate first model information.

In Step S13, the information calculator 12 stores the first model information in the memory 27.

The imaging device 2 is moved by, for example, manual operation of the user or a moving device (not shown) after the detection processing by the detector 11 is finished in Step S11, and the detection direction of the detector 11 is set to a second direction that is different from the first direction.

In Step S14, the imaging device 2 detects the object OB with the detector 11 from the second direction, and acquires, for example, visible light image data and point group data.

In Step S15, the information calculator 12 uses the detection result of the detector 11 in Step S14 to calculate second model information.

In Step S16, the information calculator 12 stores the second model information in the memory 27.

In Step S17, the model integrator 35 integrates the first model information and the second model information to calculate integrated model information.

In Step S17, the model integrator 35 reads at least one of shape information or texture information in the first model information from the memory 27, and uses at least one of the shape information or the texture information to detect a first feature point (Step S18).

The model integrator 35 calculates first feature point data including at least a feature amount at the first feature point (Step S19), and stores the first feature point data in the memory 27 (Step S20).

The model integrator 35 reads at least one of shape information or texture information in the second model information from the memory 27, and uses at least one of the shape information or the texture information to detect a second feature point (Step S21).

The model integrator 35 calculates second feature point data including at least a feature amount at the second feature point (Step S22), and stores the second feature point data in the memory 27 (Step S23).

The model integrator 35 reads the first feature point data and the second feature point data from the memory 27, and matches these feature point data (Step S24).

The model integrator 35 calculates integrated model information through the matching processing of Step S24, and stores, for example, the integrated model information in the memory 27 for each item (Step S25).

In Step S26, the imaging device 2 transmits at least a part of the integrated model information stored in the memory 27 to the information processing device 3 with the communicator 13.

For example, the information processing device 3 uses the integrated model information received from the imaging device 2 to execute rendering processing, and displays the result of the rendering processing (for example, estimated image) on the display device 5.

Third Embodiment

Next, a third embodiment is described.

In the third embodiment, the same configurations as those in the above-mentioned embodiments are denoted by the same reference symbols and descriptions thereof are simplified or omitted.

Figure 7:
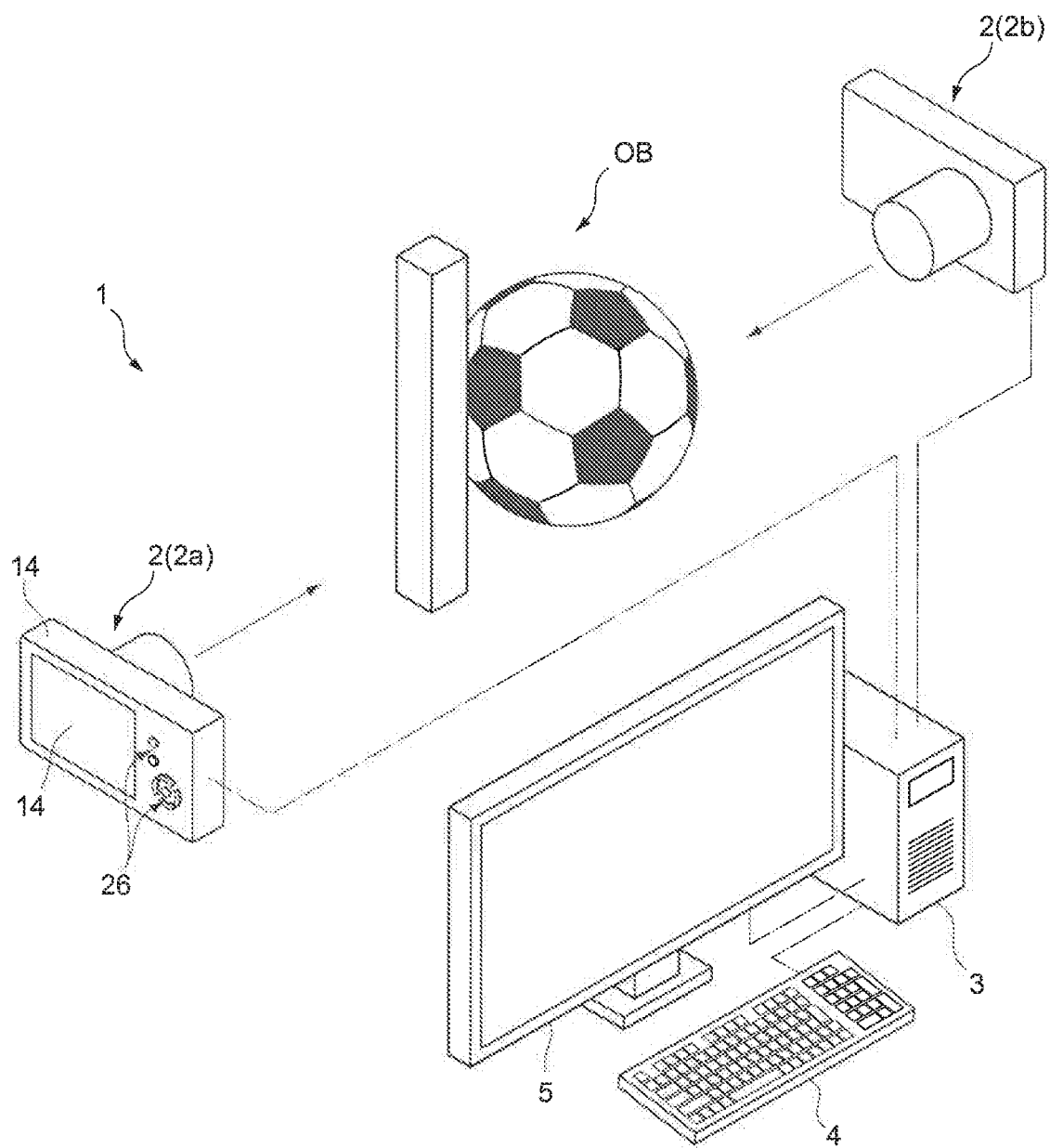
FIG. 7 is a diagram illustrating an imaging system according to a third embodiment.

FIG. 7 is a diagram illustrating an imaging system 1 according to the third embodiment.

This imaging system 1 includes a plurality of imaging devices 2.

In the following description, one of the imaging devices 2 is referred to as "first imaging device 2a" and another imaging device 2 is referred to as "second imaging device 2b".

This imaging system 1 thus includes at least two imaging devices or a plurality of imaging devices.

The first imaging device 2a detects an object OB from a first direction, and calculates first model information on the basis of the detection result.

The first imaging device 2a supplies the first model information to the information processing device 3.

The second imaging device 2b detects the object from a second direction, and calculates second model information on the basis of the detection result.

The second imaging device 2b supplies the second model information to the information processing device 3.

The information processing device 3 integrates the first model information and the second model information, and calculates integrated model information based on the detection results of detecting the object OB from different directions (for example, first direction and second direction that is different from the first direction).

Next, each unit in the imaging system 1 is described.

Figure 8:
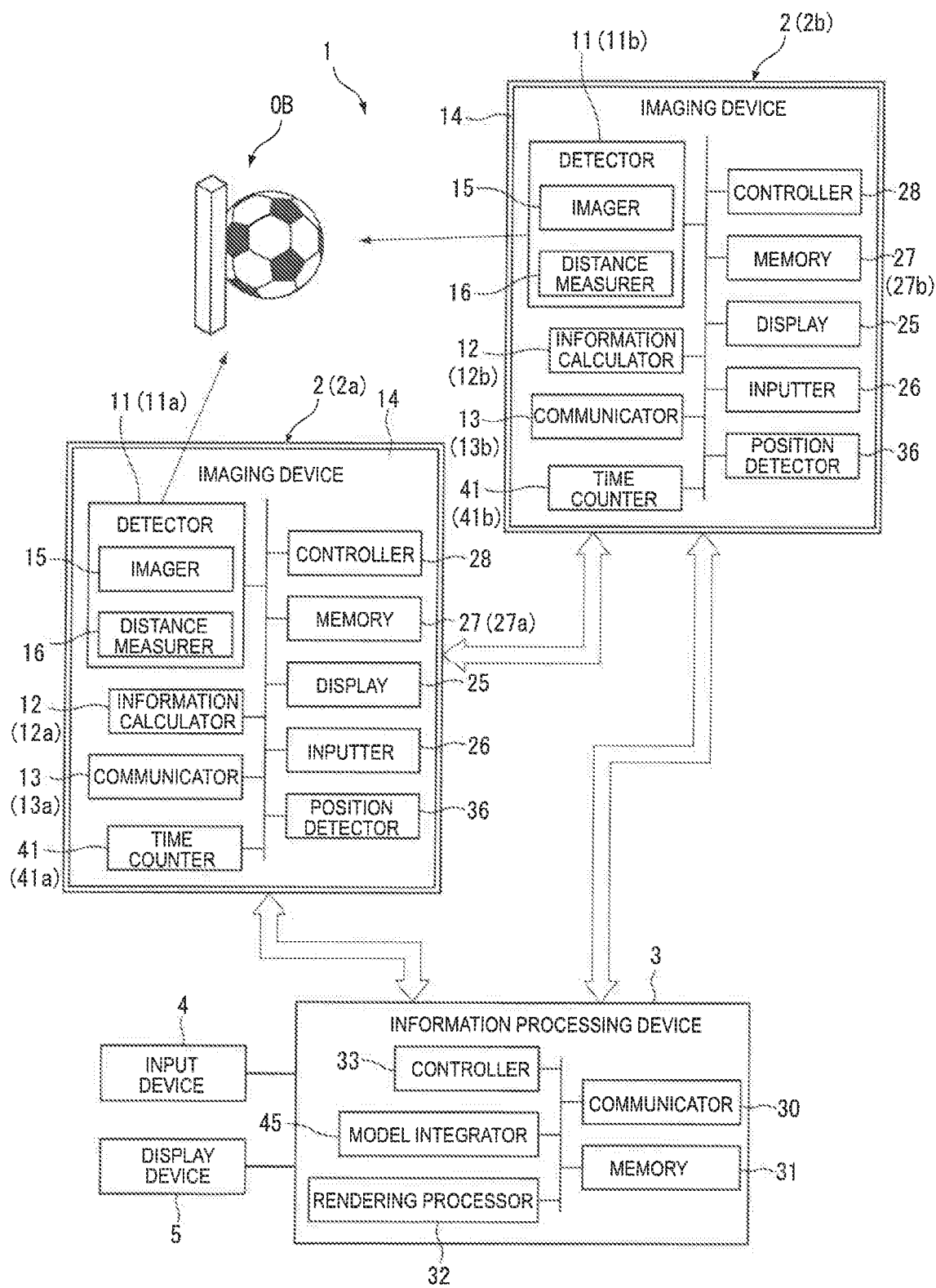
FIG. 8 is a block diagram illustrating an imaging system according to the third embodiment.

FIG. 8 is a block diagram illustrating the imaging system 1.

The first imaging device 2a includes a time counter 41 (hereinafter referred to as "time counter 41a") that detects information on the timing at which the detector 11 (hereinafter referred to as "detector 11a") detects the object OB (hereinafter referred to as "timing information").

For example, the timing information includes information representing the period (for example, date and time) in which the detector 11a performs detection processing.

The timing information may include at least one of a start time or an end time of the period in which the detector 11a performs the detection processing.

For example, the timing information is used when model integration is performed by using a plurality of detection results of the object OB detected by the imaging device at different timings.

For example, a plurality of pieces of model information may be calculated on the basis of at least two detection results of the object OB detected at relatively closer timings among the detection results, and the calculated pieces of model information may be integrated.

For example, the detector 11a stores the detection result in the memory 27 (hereinafter referred to as "memory 27a") in association with the timing information.

For example, the information calculator 12 (hereinafter referred to as "information calculator 12a") calculates first model information on the basis of the detection result of the detector 11a, and stores the calculation result in the memory 27a in association with the timing information.

The second imaging device 2b has the same configuration as the first imaging device 2a, for example.

For example, a detector 11 in the second imaging device 2b (hereinafter referred to as "detector 11b") detects the object OB from the second direction, and stores the detection result in a memory 27 (hereinafter referred to as "memory 27b") in association with timing information detected by a time counter 41 (hereinafter referred to as "time counter 41b").

For example, an information calculator 12 in the second imaging device 2b (hereinafter referred to as "information calculator 12b") calculates second model information on the basis of the detection result of the detector 11b, and stores the calculation result in the memory 27b in association with timing information.

The timing information may include information on a period during which the detector 11 is scheduled to detect the object OB.

The first imaging device 2a and the second imaging device 2b may transmit and receive the timing information, and detect the object OB in synchronization with each other by using the controller 28 and the communicator 13.

In the second embodiment, the information calculator 12a in the first imaging device 2a calculates first additional information used for the integration of the first model information and the second model information.

The first additional information includes, for example, at least one of information obtained by matching of feature point data (for example, feature amounts), position information on the detector 11a, timing information on the imaging device 2, position information on the detector 11b, or timing information on the second imaging device 2b.

For example, the first imaging device 2a receives the second model information from the second imaging device 2b, and the information calculator 12a in the first imaging device 2a uses the calculated first feature point data and the second feature point data received from the second imaging device 2b to calculate the first additional information.

In the third embodiment, the information processing device 3 includes a model integrator 45.

The model integrator 45 integrates the first model information from the first imaging device 2a and the second model information from the second imaging device 2b to generate the above-mentioned integrated model information.

An algorithm used by the model integrator 45 to integrate the model information may be, for example, the same as that of the model integrator 35 in the imaging device 2 described in the second embodiment.

For example, the communicator 30 in the information processing device 3 receives first additional information from the communicator 13a in the first imaging device 2a before model integration is performed.

For example, the model integrator 45 in the information processing device 2 uses the first model information, the second model information, and the first additional information to perform model integration.

Figure 9:
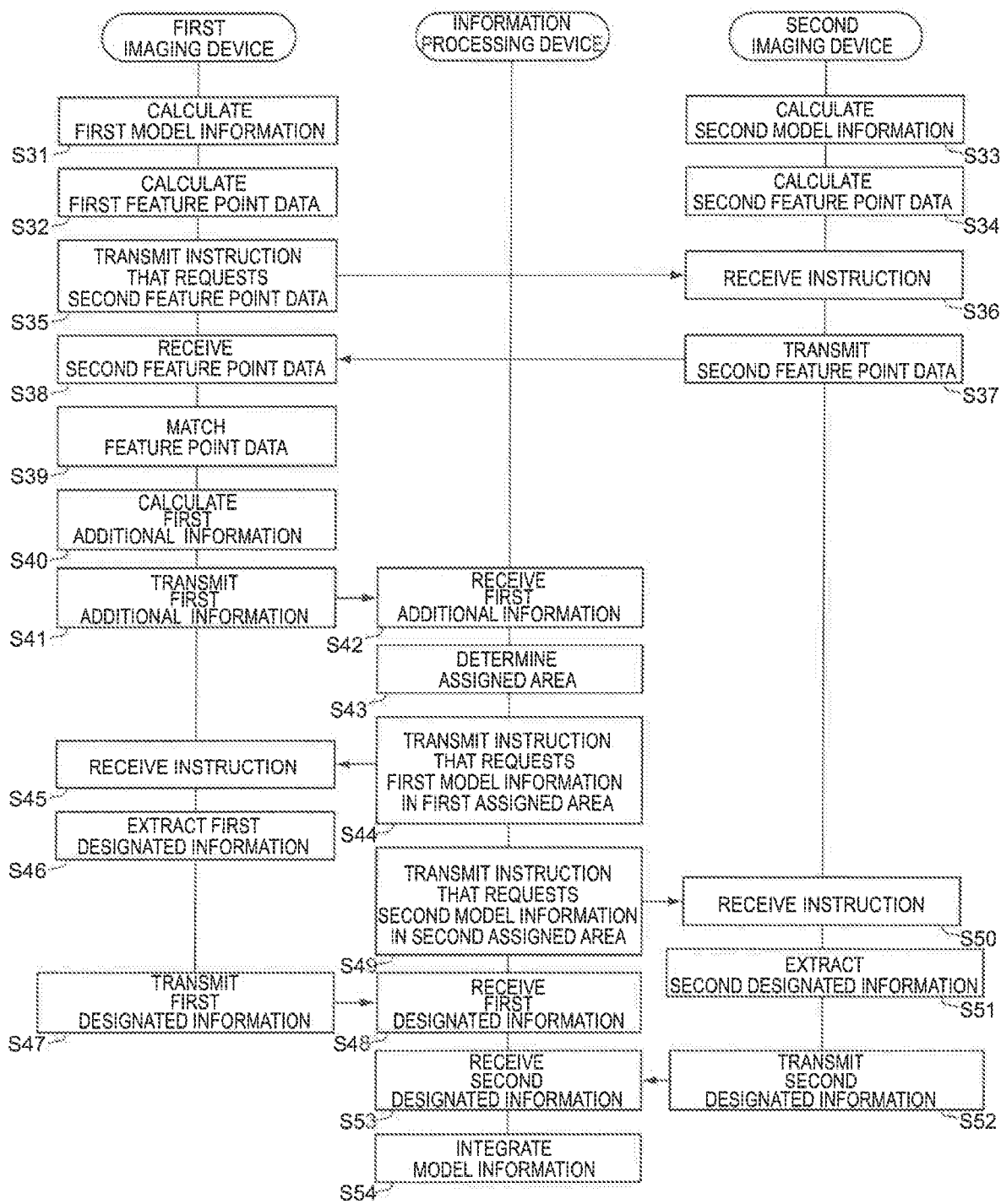
FIG. 9 is a diagram illustrating an operation of the imaging device according to the third embodiment.

FIG. 9 is a diagram illustrating the operation of the imaging system 1 according to the third embodiment.

The information calculator 12a in the first imaging device 2a calculates first model information in Step S31, and calculates first feature point data including at least a first feature amount in Step S32.

The information calculator 12b in the second imaging device 2b calculates second model information in Step S33, and calculates second feature point data including at least a second feature amount in Step S34.

In Step S35, the communicator 13a in the first imaging device 2a transmits, to the communicator 13b in the second imaging device 2b, an instruction (request instruction) that requests transmission of second feature point data.

In Step S36, the communicator 13b in the second imaging device 2b receives the request instruction from the communicator 13a in the first imaging device 2a.

In Step S37, the communicator 13b transmits the second feature point data to the communicator 13a.

In Step S38, the communicator 13a receives the second feature point data from the communicator 13b.

As described above, in the case where communication (data communication) of at least the feature point data (for example, first feature point data and/or second feature point data) is performed between imaging devices (for example, between first imaging device and second imaging device), each imaging device can calculate information necessary for integration of model information, and hence the information processing device 3 can reduce the load for integration.

The above-mentioned feature point data (such as first feature point data and second feature point data) may be created by the information processing device 3.

In this case, for example, the information processing device 3 generates first feature point data and second feature point data by using model information received from each imaging device or one of imaging devices (for example, first imaging device 2a).

The above-mentioned feature point data (for example, first feature point data or second feature point data) may be generated by the first imaging device 2a (or second imaging device 2b).

In this case, for example, the first imaging device 2a generates second feature point data on the basis of second model information received from the second imaging device 2b.

In Step S39, the information calculator 12a in the first imaging device 2a matches the first feature point data and the second feature point data (feature part matching processing), and in Step S40, calculates first additional information representing the result of matching.

The first additional information includes, for example, information representing a positional relation between the shape represented by the first model information and the shape represented by the second model information.

The first additional information includes, for example, coordinates of a feature point common to the first feature data and the second feature data and/or a feature amount common to the first feature data and the second feature data.

For example, the information calculator 12a stores the calculated first additional information in the memory 27a.

For example, the first additional information may be information on one item in the first model information.

In Step S41, the communicator 13a in the first imaging device 2a transmits the first additional information to the communicator 30 in the information processing device 3.

In Step S42, the communicator 30 in the information processing device 3 receives the first additional information from the communicator 13a.

In Step S43, the information processing device 3 determines and sets a first assigned area assigned to first model information transmitted from the first imaging device 2a and a second assigned area assigned to second model information transmitted from the second imaging device 2b in the integrated model information.

For example, the model integrator 45 selects the assigned areas such that the first assigned area and the second assigned area do not overlap with each other.

In Step S44, the controller 33 in the information processing device 3 controls the communicator 30 to transmit, to the communicator 13a in the first imaging device 2a, an instruction (first request signal) that requests transmission of first model information in the first assigned area.

The first model information in the first assigned area is hereinafter referred to as "first designated information".

Examples of the first designated information include information on a part of the shape represented by the first model information.

In Step S45, the communicator 13a in the first imaging device 2a receives the instruction transmitted in Step S44.

In Step S46, the information calculator 12a in the first imaging device 2a extracts first designated information from the first model information.

In Step S47, the communicator 13a in the first imaging device 2a transmits the first designated information to the communicator 30 in the information processing device 3.

In Step S48, the communicator 30 receives the first designated information from the communicator 13a.

In Step S49 after the processing of Step S44, the controller 33 in the information processing device 3 controls the communicator 30 to transmit, to the communicator 13b in the second imaging device 2b, an instruction (second request signal) that requests transmission of second model information in second assigned area.

The second model information in the second assigned area is hereinafter referred to as "second designated information".

Examples of the second designated information include information about the shape of a part of the shape represented by the second model information.

In Step S50, the communicator 13b in the second imaging device 2b receives the instruction transmitted in Step S49.

In Step S51, the information calculator 12b in the second imaging device 2b extracts second designated information from the second model information.

In Step S52, the communicator 13b in the second imaging device 2b transmits the second designated information to the communicator 30 in the information processing device 3.

In Step S53, the communicator 30 in the information processing device 3 receives the second designated information from the communicator 13b.

In Step S54, the model integrator 45 in the information processing device 3 integrates first designated information, which is a part of the first model information, and second designated information, which is a part of the second model information, to calculate integrated model information.

For example, the model integrator 45 generates the integrated model information by using information (for example, additional information or designated information) obtained by sharing of model information (for example, first model information or second model information) or feature point data (for example, first feature point data or second feature point data) among a plurality of imaging devices (for example, sharing of information by bidirectional communication or unidirectional communication).

In order to generate the above-mentioned additional information, for example, the imaging device 2a and the imaging device 2b perform data communication of information (for example, first model information, second model information, first feature point data, or second feature point data) among the imaging device.

Fourth Embodiment

Next, a fourth embodiment is described.

In the fourth embodiment, the same configurations as those in the above-mentioned embodiments are denoted by the same reference symbols and descriptions thereof are simplified or omitted.

The imaging system 1 according to the fourth embodiment has the same configuration as in FIG. 7 and FIG. 8.

In the fourth embodiment, the first imaging device 2a and the second imaging device 2b each calculate additional information used for model integration.

In the fourth embodiment, the information processing device 3 checks integrated model information and performs interpolation processing as appropriate.

Figure 10:
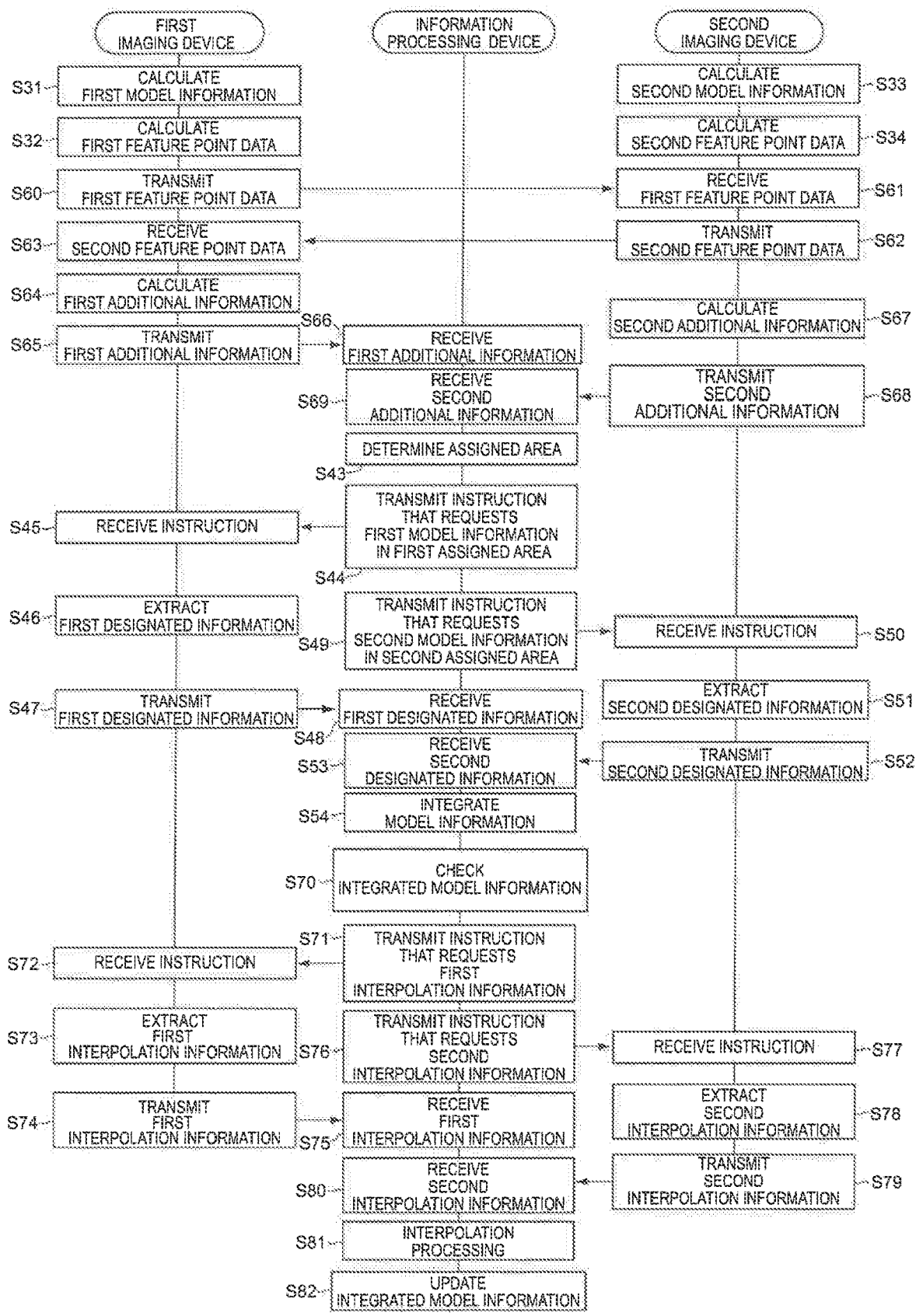
FIG. 10 is a diagram illustrating an operation of an imaging system according to a fourth embodiment.

FIG. 10 is a diagram illustrating the operation of the imaging system 1 according to the fourth embodiment.

In FIG. 10, processing similar to that in FIG. 9 is denoted by the same reference symbol and descriptions thereof are simplified or omitted.

The information calculator 12a in the first imaging device 2a calculates first model information in Step S31, and calculates first feature point data including at least a first feature amount in Step S32.

The information calculator 12b in the second imaging device 2b calculates second model information in Step S33, and calculates second feature point data including at least a second feature amount in Step S34.

In Step S60, the communicator 13a in the imaging device 2 transmits the first feature point data to the communicator 13b in the second imaging device 2b.

In Step S61, the communicator 13b receives the first feature point data from the communicator 13a.

In Step S62, the communicator 13b transmits the second feature point data to the communicator 13a.

In Step S63, the communicator 13a receives the second feature point data from the communicator 13b.

In Step S64, the information calculator 12a in the first imaging device 2a matches the first feature point data with the second feature point data to calculate first additional information representing the result of matching.

In Step S65, the communicator 13a in the first imaging device 2a transmits the first additional information to the communicator 30 in the information processing device 3.

In Step S66, the communicator 30 receives the first additional information from the communicator 13a.

Similarly to the first imaging device 2a, the information calculator 12b in the second imaging device 2b matches the first feature point data with the second feature point data, and calculates second additional information representing the result of matching in Step S67.

The information calculator 12b stores the calculated second additional information in the memory 27b.

The second additional information is similar to the first additional information, and, for example, may be information on one item in second model information.

In Step S68, the communicator 13b in the second imaging device 2b transmits the second additional information to the communicator 30 in the information processing device 3.

In Step S69, the communicator 30 receives the second additional information from the communicator 13b.

For example, the imaging system 1 integrates first model information and second model information through the processing in Step S43 to Step S54 described above with reference to FIG. 9.

For example, the model integrator 45 in the information processing device 3 stores the calculated integrated model information in the memory 31.

In Step S70, the model integrator 45 checks (determines) the consistency of the calculated integrated model information.

When the model integrator 45 determines that the integrated model information is inconsistent, for example, the model integrator 45 performs the following processing.

In Step S71, the controller 33 in the information processing device 3 controls the communicator 30 to transmit an instruction that requests transmission of first interpolation information (request signal) to the communicator 13a in the first imaging device 2a.

The first interpolation information is, for example, information used for interpolation of integrated model information, and includes information on an area where the shape represented by the first model information and the shape represented by the second model information overlap with each other.

In Step S72, the communicator 13a in the first imaging device 2a receives the instruction transmitted in Step S68.

In Step S73, the information calculator 12a in the first imaging device 2a extracts first interpolation information from the first model information.

In Step S74, the communicator 13a in the first imaging device 2a transmits the first interpolation information to the communicator 30 in the information processing device 3.

In Step S75, the communicator 30 receives the first interpolation information from the communicator 13a.

In Step S76 after Step S71, the controller 33 in the information processing device 3 controls the communicator 30 to transmit an instruction that requests transmission of second interpolation information (request signal) to the communicator 13b in the second imaging device 2b.

The second interpolation information is, for example, information used for interpolation of integrated model information, and includes information on an area where the shape represented by the first model information and the shape represented by the second model information overlap with each other.

In Step S77, the communicator 13b in the second imaging device 2b receives the instruction transmitted in Step S76.

In Step S78, the information calculator 12b in the second imaging device 2b extracts second interpolation information from the second model information.

In Step S79, the communicator 13b in the second imaging device 2b transmits the second interpolation information to the communicator 30 in the information processing device 3.

In Step S80, the communicator 30 receives the second interpolation information from the communicator 13b.

In Step S81, the model integrator 45 in the information processing device 3 uses the first interpolation information and the second interpolation information to perform interpolation processing on the integrated model information.

In Step S82, the model integrator 45 updates the integrated model information stored in the memory 31 with the integrated model information after the interpolation processing.

For example, the model integrator 45 generates integrated model information by using information (for example, additional information or designated information) obtained by sharing of model information (for example, first model information or second model information) or feature point data (for example, first feature point data or second feature point data) among the imaging devices (for example, sharing of information by bidirectional communication or unidirectional communication).

Fifth Embodiment

Next, a fifth embodiment is described.

In the fifth embodiment, the same configurations as those in the above-mentioned embodiments are denoted by the same reference symbols and descriptions thereof are simplified or omitted.

Figure 11:
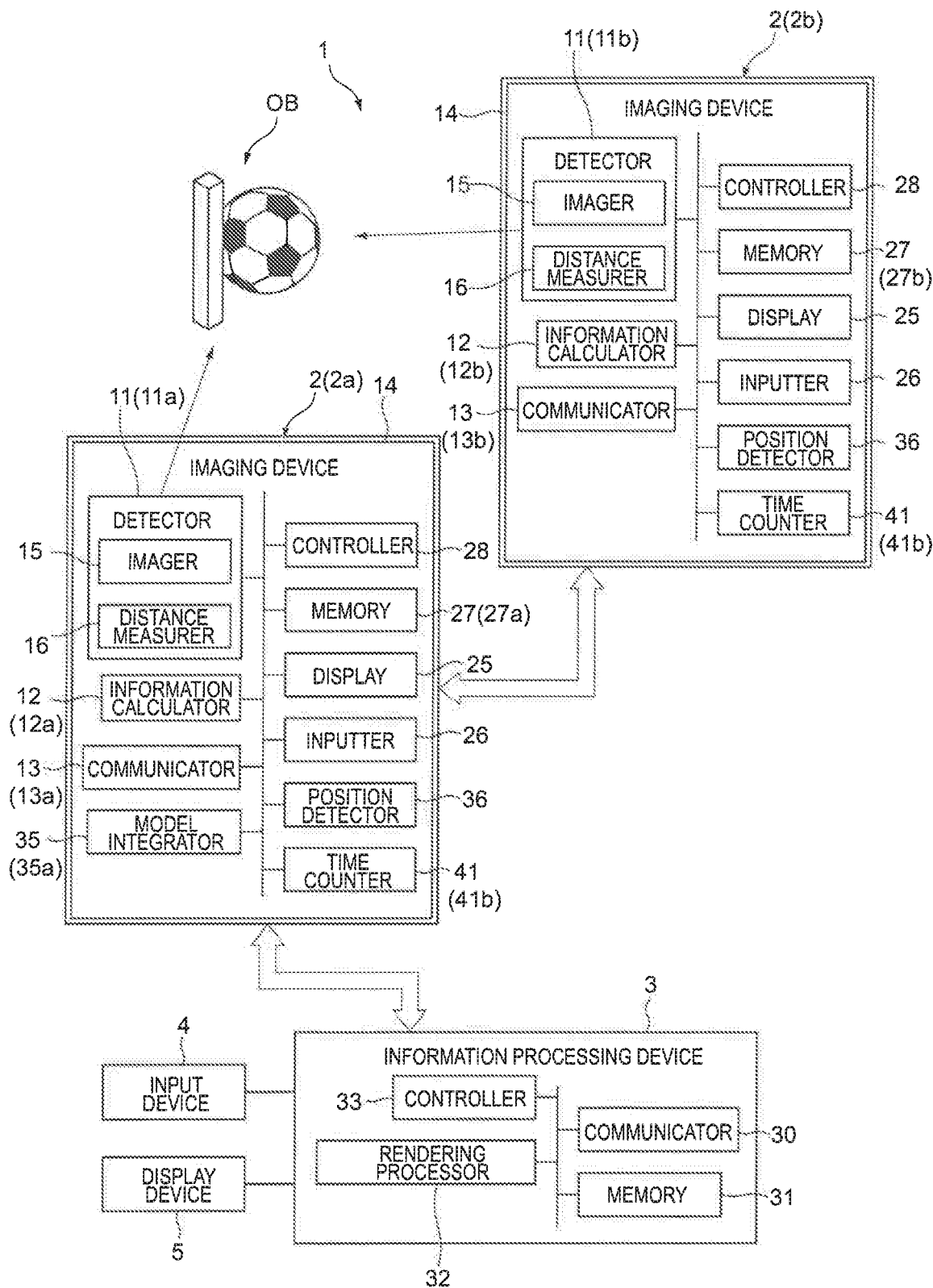
FIG. 11 is a block diagram illustrating an imaging system according to a fifth embodiment.

FIG. 11 is a block diagram illustrating an imaging system 1 according to the fifth embodiment.

The imaging system 1 according to the fifth embodiment includes a first imaging device 2a, a second imaging device 2b, and an information processing device 3.

The first imaging device 2a includes, for example, a model integrator 35 (hereinafter referred to as "model integrator 35a") similar to that in the second embodiment.

The model integrator 35a integrates first model information calculated by the information calculator 12a and second model information received by the communicator 13a from the second imaging device 2b.

The communicator 13a transmits the integrated model information calculated by the model integrator 35a to the communicator 30 in the information processing device 3.

Figure 12:
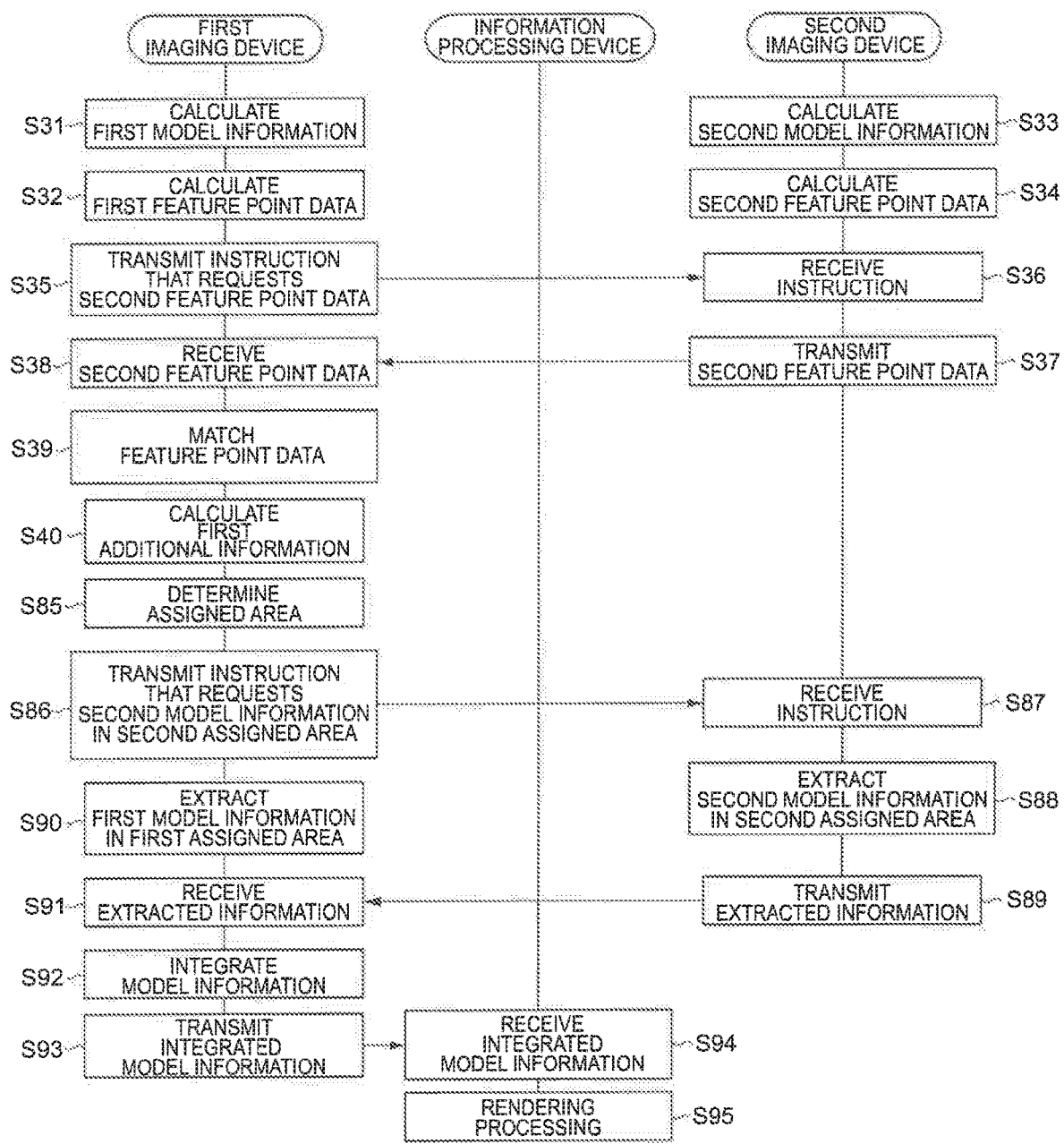
FIG. 12 is a diagram illustrating an operation of the imaging system according to the fifth embodiment.

FIG. 12 is a diagram illustrating the operation of the imaging system 1 according to the fifth embodiment.

In FIG. 12, processing similar to that in FIG. 9 and other figures is denoted by the same reference symbol and descriptions thereof are omitted or simplified.

The imaging system 1 executes the processing in Step S31 to Step S40 to calculate first additional information used for model integration.

In Step S85, the first imaging device 2a determines and sets a first assigned area assigned to the first model information and a second assigned area assigned to second model information transmitted from the second imaging device 2b in the integrated model information.

For example, the model integrator 35a selects the assigned areas such that the first assigned area and the second assigned area do not overlap with each other.

In Step S86, the controller 28 in the first imaging device 2a controls the communicator 13a to transmit, to the communicator 13b in the second imaging device 2b, an instruction that requests transmission of second model information in the second assigned area.

In Step S87, the communicator 13b in the second imaging device 2b receives the instruction transmitted in Step S86.

In Step S88, the information calculator 12b in the second imaging device 2b extracts information in the second assigned area designated by first imaging device 2a from the second model information.

In Step S89, the communicator 13b in the second imaging device 2b transmits information extracted by the information calculator 12b in Step S86 (extracted information) to the communicator 13a in the first imaging device 2a.

In Step S90, the information calculator 12a in the first imaging device 2a extracts first model information in the first assigned area.

In Step S91, the communicator 13a in the first imaging device 2a receives extracted information (for example, second model information in second assigned area) from the communicator 13b.

In Step S92, the model integrator 35a in the first imaging device 2a integrates the first model information in the first assigned area and the second model information in the second assigned area to calculate integrated model information.

In Step S93, the communicator 13a in the first imaging device 2a transmits the integrated model information to the communicator 30 in the information processing device 3.

In Step S94, the communicator 30 receives the integrated model information from the communicator 13a.

In Step S95, the rendering processor 32 in the information processing device 3 executes rendering processing by using the integrated model information.

For example, the model integrator 35a in the first imaging device 2a generates integrated model information by using information (for example, additional information or designated information) obtained by sharing of model information (for example, first model information or second model information) or feature point data (for example, first feature point data or second feature point data) among the imaging devices (for example, sharing of information by bidirectional communication or unidirectional communication).

Sixth Embodiment

Next, a sixth embodiment is described.

In the sixth embodiment, the same configurations as those in the above-mentioned embodiments are denoted by the same reference symbols and descriptions thereof are simplified or omitted.

Figure 13:
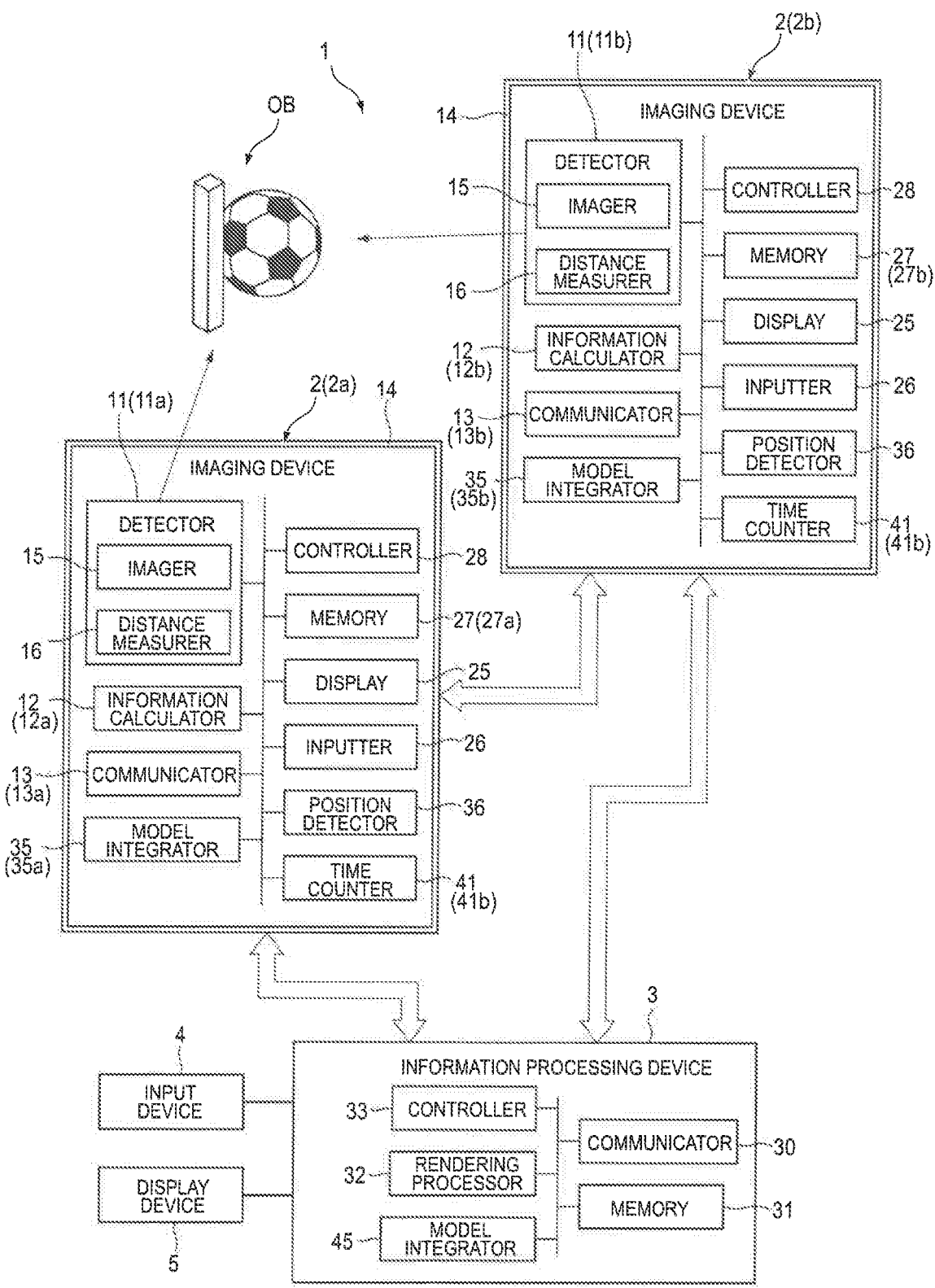
FIG. 13 is a block diagram illustrating an imaging system of a sixth embodiment.

FIG. 13 is a block diagram illustrating an imaging system 1 according to the sixth embodiment.

In the sixth embodiment, the first imaging device 2a and the second imaging device 2b mutually communicate information used for model integration, and each calculate integrated model information.

For example, the first imaging device 2a calculates integrated model information through the processing described above with reference to FIG. 12.

For example, the second imaging device 2b calculates integrated model information by performing the same processing as in the first imaging device 2a.

The information processing device 3 receives integrated model information from at least one of the first imaging device 2a or the second imaging device 2b, and executes rendering processing by using the received integrated model information.

For example, the communicator 30 in the information processing device 3 transmits, to the communicator 13a in the first imaging device 2a, an instruction to transmit integrated model information.

The controller 28 in the first imaging device 2a controls the communicator 13a to transmit information about items designated by the instruction among items in the integrated model information to the communicator 30 in the information processing device 3.

Similarly, the information processing device 3 can control the second imaging device 2b to transmit integrated model information.

For example, the information processing device 3 may monitor load information (for example, proportion of load to processing capability) in each unit in the imaging system 1, and may allocate processing related to model integration to a processor having a relatively smaller load in the imaging system 1.

For example, the controller 28 in the first imaging device 2a generates load information on the first imaging device 2a.

The load information on the first imaging device 2a includes, for example, load information on the information calculator 12a and load information on the model integrator 35a.

The communicator 13a in the first imaging device 2a transmits the load information on the first imaging device 2a to the communicator 30 in the information processing device 3.

Similarly, the second imaging device 2b transmits the load information on the second imaging device 2b to the communicator 30 in the information processing device 3.

The controller 33 in the information processing device 3 compares the loads in the respective units on the basis of the received load information, and controls a processor having a relatively smaller load to cause only one of the imaging devices to execute processing (processing related to model integration) or to cause a plurality of imaging devices to execute processing (processing related to model integration) in a partially shared manner.

For example, when the controller 33 determines that the load on the model integrator 35a in the first imaging device 2a is larger than the load on the model integrator 35b in the second imaging device 2b, the controller 33 may restrict at least a part of model integration performed by the first imaging device 2a, and control the second imaging device 2b to execute the restricted processing.

For example, the controller 33 may prohibit the calculation of first additional information by the first imaging device 2a, and control the second imaging device 2b to transmit second additional information to the first imaging device 2a, and the first imaging device 2a may perform model integration by using the second additional information.

For example, the controller 33 may prohibit the assigned area determination processing by the first imaging device 2a, and control the second imaging device 2b to transmit assigned area information defining an assigned area to the first imaging device 2a, and the first imaging device 2a may perform model integration by using the assigned area information.

For example, the controller 33 may prohibit the model integration by the first imaging device 2a, and receive integrated model information from the second imaging device 2b.

When the controller 33 determines that the load on the information processing device 3 is smaller than each of the loads on the first imaging device 2a and the second imaging device 2b, the controller 33 may limit at least a part of model integration processing by at least one of the first imaging device 2a or the second imaging device 2b and control the model integrator 45 to execute the limited processing.

For example, the controller 33 may prohibit the assigned area determination processing by each of the first imaging device 2a and the second imaging device 2b, and control the model integrator 45 to execute the assigned area determination processing and transmit assigned area information to each of the first imaging device 2a and the second imaging device 2b.

The controller 33 may prohibit the processing of model integration by each of the first imaging device 2a and the second imaging device 2b, and control the model integrator 45 in the information processing device 3 to execute the processing of model integration.

A load controller (load monitor) that executes at least one of control or monitoring of the load in the imaging system 1 as exemplified by the above-mentioned controller 33 may be provided in the first imaging device 2a (for example, controller 28) or provided in the second imaging device 2b (for example, controller 28).

The load controller (load monitor) may be provided outside the imaging system 1, and is not necessarily required to be provided in the imaging system 1.

For example, the model integrator 35a in the first imaging device 2a (or/and the model integrator 35b in the second imaging device 2b) generates integrated model information by using information (for example, additional information or designated information) obtained by sharing of model information (for example, first model information or second model information) or feature point data (for example, first feature point data or second feature point data) among the imaging devices (for example, sharing of information by bidirectional communication or unidirectional communication).

Seventh Embodiment

Next, a seventh embodiment is described.

In the seventh embodiment, the same configurations as those in the above-mentioned embodiments are denoted by the same reference symbols and descriptions thereof are simplified or omitted.

Figure 14:
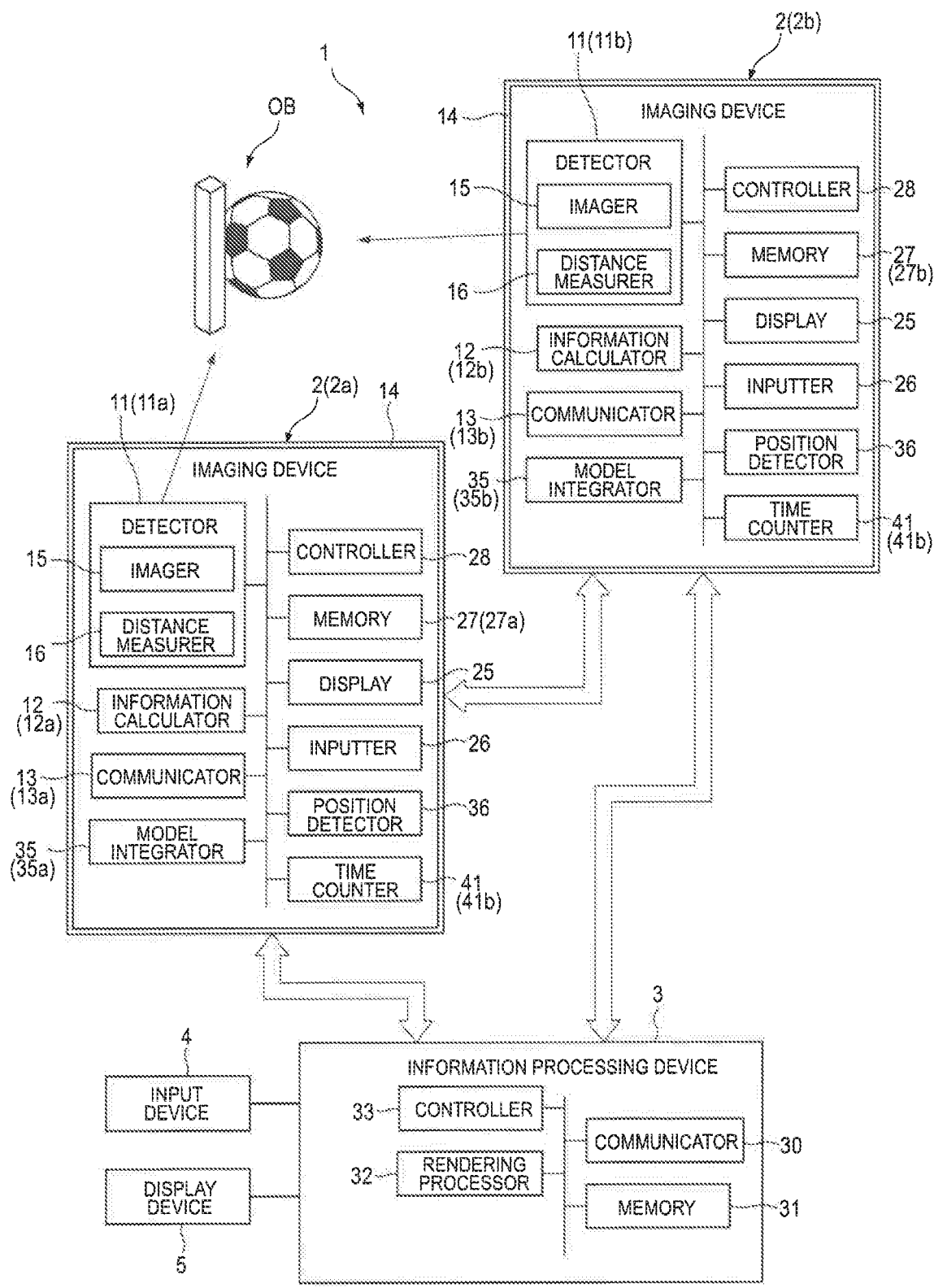
FIG. 14 is a block diagram illustrating an imaging system according to a seventh embodiment.

FIG. 14 is a block diagram illustrating an imaging system 1 according to the seventh embodiment.

The imaging system 1 according to the seventh embodiment includes a first imaging device 2a, a second imaging device 2b, and an information processing device 3.

The first imaging device 2a and the second imaging device 2b are each capable of calculating integrated model information.

In the seventh embodiment, the information processing device 3 does not include a model integrator.

The information processing device 3 receives integrated model information from at least one of the first imaging device 2a or the second imaging device 2b, and uses the received integrated model information to execute rendering processing.

Figure 15:
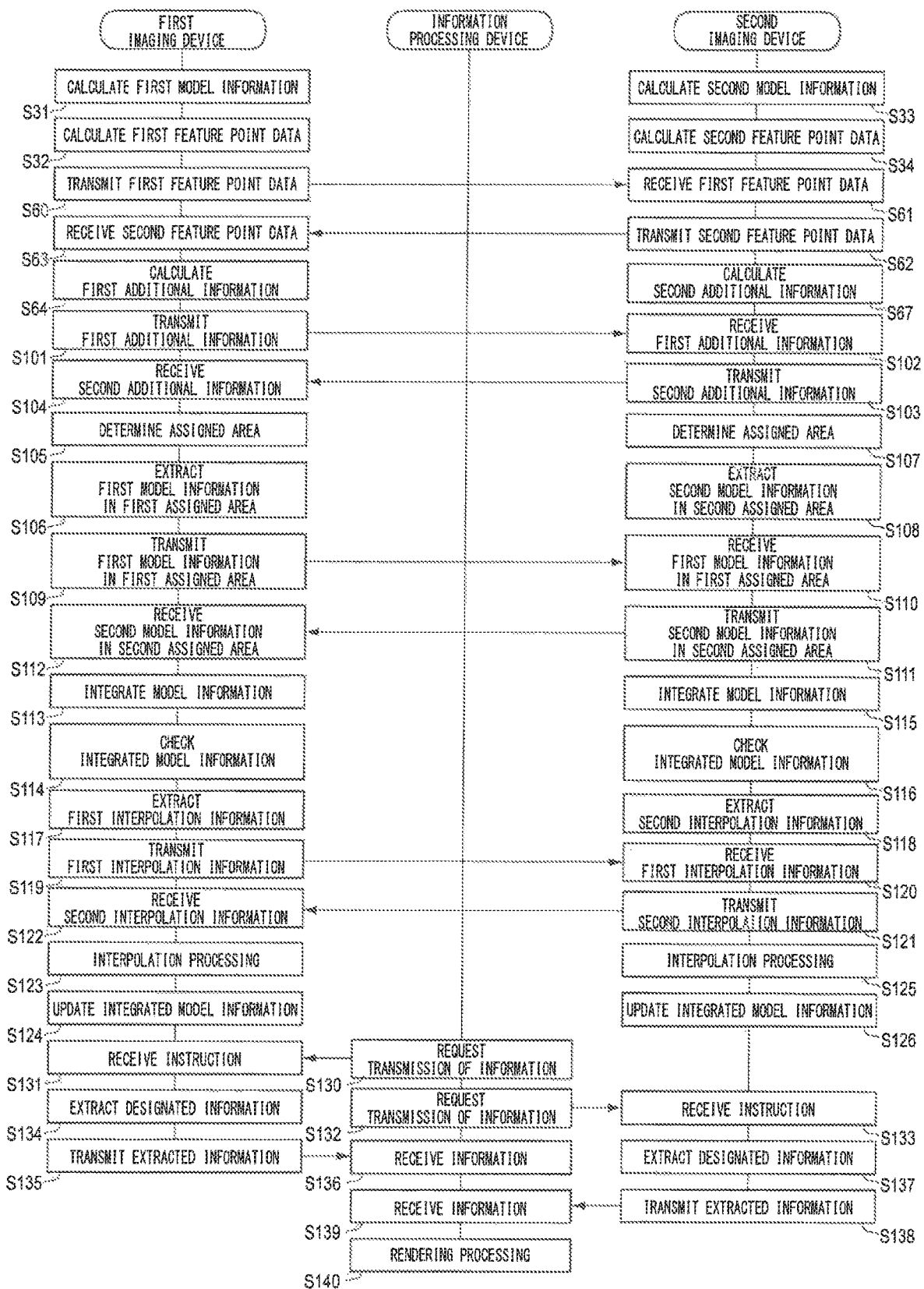
FIG. 15 is a diagram illustrating an operation of the imaging system according to the seventh embodiment.

FIG. 15 is a diagram illustrating the operation of the imaging system 1 according to the seventh embodiment.

In the following description, processing similar to that in FIG. 10 is denoted by the same reference symbol and descriptions thereof are omitted or simplified.

The first imaging device 2a calculates first model information (Step S31), and calculates first feature point data (Step S32).

The second imaging device 2b calculates second model information (Step S33), and calculates second feature point data (Step S34).

The communicator 13a in the first imaging device 2a transmits the first feature point data to the communicator 13b in the second imaging device 2b (Step S60), and the communicator 13b receives the first feature point data (Step S61).

The communicator 13b transmits the second feature point data to the communicator 13a in the first imaging device 2a (Step S62), and the communicator 13a receives the second feature point data (Step S63).

The information calculator 12a in the first imaging device 2a uses the first feature point data and the second feature point data to calculate first additional information (Step S64).

The information calculator 12b in the second imaging device 2b uses the first feature point data and the second feature point data to calculate second additional information (Step S67).

The communicator 13a in the first imaging device 2a transmits the first additional information to the communicator 13b in the second imaging device 2b (Step S101), and the communicator 13b receives the first additional information (Step S102).

The communicator 13b transmits the second additional information to the communicator 13a in the first imaging device 2a (Step S103), and the communicator 13a receives the second additional information (Step S104).

The model integrator 35a in the first imaging device 2a uses the first additional information and the second additional information to determine an assigned area (Step S105).

The information calculator 12a in the first imaging device 2a extracts first model information in a first assigned area (Step S106).

The model integrator 35b in the second imaging device 2b uses the first additional information and the second additional information to determine an assigned area (Step S107).

The information calculator 12b in the second imaging device 2b extracts second model information in a second assigned area (Step S108).

The communicator 13a in the first imaging device 2a transmits the first model information in the first assigned area to the communicator 13b in the second imaging device 2b (Step S109), and the communicator 13b receives the first model information in the first assigned area (Step S110).

The communicator 13b transmits the second model information in the second assigned area to the communicator 13a in the first imaging device 2a (Step S111), and the communicator 13a receives the second model information in the second assigned area (Step S112).

The model integrator 35a in the first imaging device 2a uses the first model information in the first assigned area and the second model information in the second assigned area to perform model integration (Step S113).

The model integrator 35a checks the thus obtained integrated model information (first integrated model information) (Step S114).

The model integrator 35b in the second imaging device 2b uses the first model information in the first assigned area and the second model information in the second assigned area to perform model integration (Step S115).

The model integrator 35b checks the thus obtained integrated model information (second integrated model information) (Step S116).

When determining that the integrated model information is inconsistent, for example, the model integrator 35a in the first imaging device 2a and the model integrator 35b in the second imaging device 2b each perform the following processing.

The information calculator 12a in the first imaging device 2a extracts first interpolation information (Step S117).

The information calculator 12b in the second imaging device 2b extracts second interpolation information (Step S118).

The communicator 13a in the first imaging device 2a transmits the first interpolation information to the communicator 13b in the second imaging device 2b (Step S119), and the communicator 13b receives the first interpolation information (Step S120).

The communicator 13b transmits the second interpolation information to the communicator 13a in the first imaging device 2a (Step S121), and the communicator 13a receives the second interpolation information (Step S122).

The model integrator 35a in the first imaging device 2a uses the first interpolation information and the second interpolation information to perform interpolation processing (Step S123).

The model integrator 35a updates the integrated model information stored in the memory 27a with the interpolated integrated model information (Step S124).

The model integrator 35b in the second imaging device 2b uses the first interpolation information and the second interpolation information to perform interpolation processing (Step S125).

The model integrator 35b updates the integrated model information stored in the memory 27b with the interpolated integrated model information (Step S126).

The information processing device 3 receives information from the first imaging device 2a.

For example, the communicator 30 in the information processing device 3 transmits an instruction that requests transmission of information used for rendering processing to the communicator 13a in the first imaging device 2a (Step S130), and the communicator 13a receives the instruction transmitted in Step S130 (Step S131).

For example, the information calculator 12a in the first imaging device 2a extracts information designated by the instruction in Step S130 from the model information (first model information or integrated model information) (Step S134).

The communicator 13a in the first imaging device 2a transmits the information extracted in Step S134 to the communicator 30 in the information processing device 3 (Step S135), and the communicator 30 receives the information transmitted in Step S134 (Step S136).

The information processing device 3 receives information from the second imaging device 2b as necessary.

For example, in the case where information held by the second imaging device 2b is used for rendering processing, the communicator 30 in the information processing device 3 transmits, to the communicator 13b in the second imaging device 2b, an instruction that requests transmission of information used for rendering processing (Step S132), and the communicator 13b receives the instruction transmitted in Step S132 (Step S133).

For example, the information calculator 12b in the second imaging device 2b extracts the information designated by the instruction transmitted in Step S132 from the model information (second model information or integrated model information) (Step S137).

The communicator 13b in the second imaging device 2b transmits the information extracted in Step S137 to the communicator 30 in the information processing device 3 (Step S138), and the communicator 30 receives the information transmitted in Step S138 (Step S139).

For example, the rendering processor 32 in the information processing device 3 executes rendering processing by using information received from the first imaging device 2a and information received from the second imaging device 2b.

In the case where information held by the second imaging device 2b is not used for rendering processing, the information processing device 3 does not need to receive the information from the second imaging device 2b.

For example, the communicator 30 in the information processing device 3 is not necessarily required to transmit an instruction that requests transmission of information to the communicator 13b in the second imaging device 2b.

For example, the model integrator 35a in the first imaging device 2a generates integrated model information (first integrated model information) by using information (for example, additional information or designated information) obtained by sharing of model information (for example, first model information or second model information) or feature point data (for example, first feature point data or second feature point data) among the imaging devices (for example, sharing of information by bidirectional communication or unidirectional communication).

For example, the model integrator 35b in the second imaging device 2b generates integrated model information (second integrated model information) by using information (for example, additional information or designated information) obtained by sharing of model information (for example, first model information or second model information) or feature point data (for example, first feature point data or second feature point data) among the imaging devices (for example, sharing of information by bidirectional communication or unidirectional communication).

For example, in the case where different imaging devices image the same object OB and each generate integrated model information for a corresponding imaging device, a plurality of imaging devices (for example, first imaging device 2a and second imaging device 2b) may perform dispersion processing on model integration of the entire object OB in each imaging device to each generate integrated model information (for example, first integrated model information or second integrated model information).

In this case, for example, the integrated model information obtained through the dispersion processing by the imaging device is partial integrated model information on the object OB.

In such a case, for example, the first integrated model information generated through the dispersion processing may be a partial integrated model corresponding to 50% of the entire area of the object OB, and the first integrated model information and the second integrated model information may share the integrated model information on the entire object OB.

In response to a request from the information processing device 3 or a reproduction device such as a device capable of rendering processing, the imaging device transmits information (for example, first integrated model information or second integrated model information) necessary for rendering to the information processing device 3 or the reproduction device.

Eighth Embodiment

Next, an eighth embodiment is described.

In the eighth embodiment, the same configurations as those in the above-mentioned embodiments are denoted by the same reference symbols and descriptions thereof are simplified or omitted.

Figure 16:
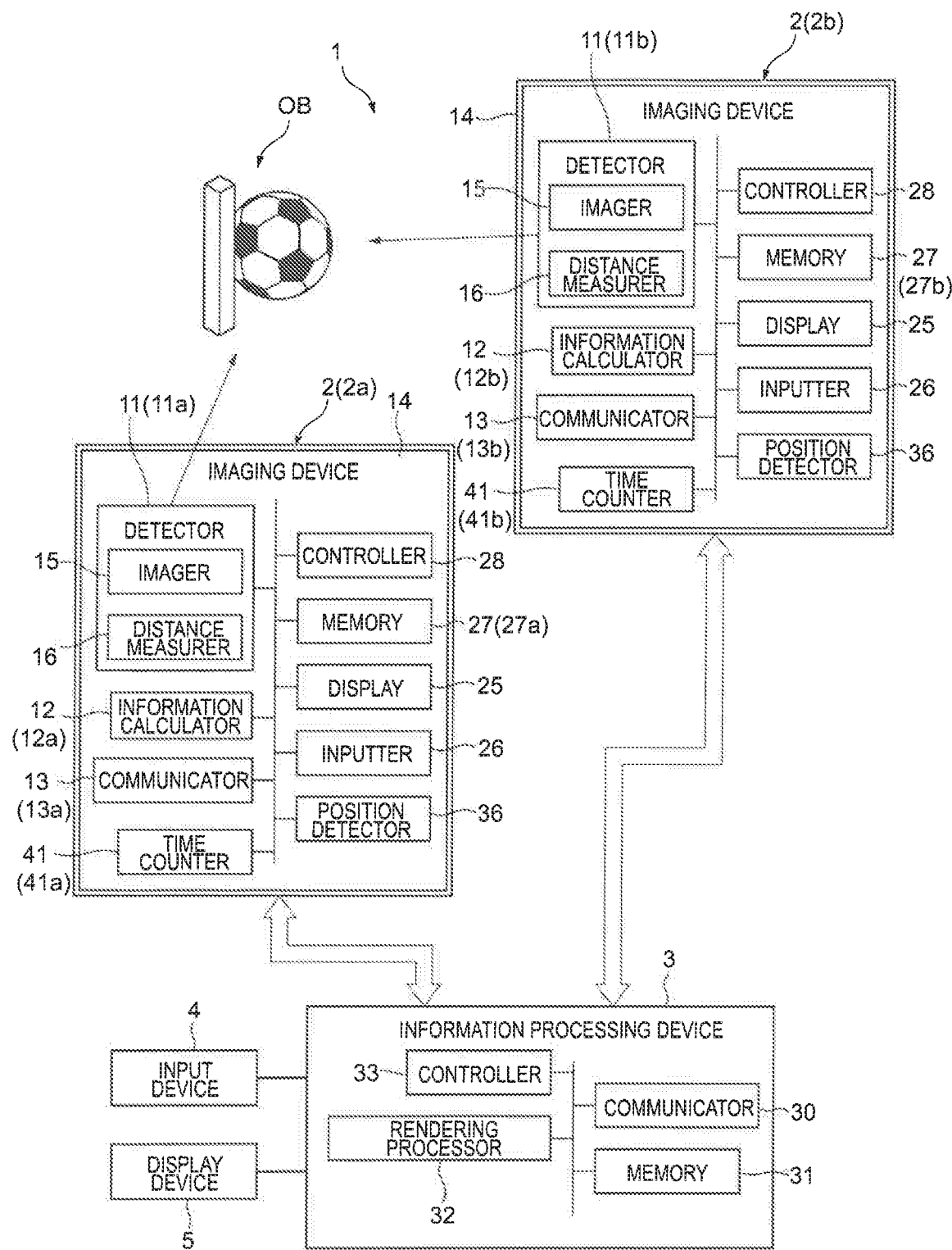
FIG. 16 is a diagram illustrating an operation of an imaging system according to an eighth embodiment.

FIG. 16 is a block diagram illustrating an imaging system 1 according to the eighth embodiment.

In the eighth embodiment, none of the first imaging device 2a, the second imaging device 2b, and the information processing device 3 includes the above-mentioned model integrator.

For example, the information processing device 3 uses information (for example, integrated model information) received from the first imaging device 2a to execute first rendering processing, and then uses information (for example, integrated model information) received from the second imaging device 2b to execute second rendering processing.

For example, in the first rendering processing, the rendering processor 32 generates a first estimated image of an object OB viewed from a first viewpoint.

For example, in the second rendering processing, the rendering processor 32 generates a second estimated image of the object OB viewed from a second viewpoint.

For example, if missing of a model occurs only with information held by the first imaging device 2a when a second estimated image is generated, the information processing device 3 requests the second imaging device 2b to transmit information.

For example, the communicator 30 in the information processing device 3 may sequentially receive information used for the second rendering processing in the period during which the first rendering processing is performed.

With the configuration described above, for example, in order for the information treatment device 3 to obtain information necessary for the rendering processing in the information processing device 3, the imaging system 1 according to the eighth embodiment includes an information processing device (model integration processing device) including: a communicator capable of receiving information such as model information and additional information and transmitting information such as calculated integrated model information to an external device; and a model integrator that performs model integration processing.

At least one of the first imaging device 2a, the second imaging device 2b, or the information processing device 3 may include a model integrator.

For example, the second imaging device 2b may include a model integrator, and the first imaging device 2a and the information processing device 3 do not need to include a model integrator.

In this case, for example, the information processing device 3 may use information received from the first imaging device 2a to execute the above-mentioned first rendering processing.

The second imaging device 2b may perform at least a part of model integration processing in the period during which the first rendering processing is performed.

The information processing device 3 may use integrated model information received from the second imaging device 2b to execute the second rendering processing after the first rendering processing.

Ninth Embodiment

Next, a ninth embodiment is described.

In the ninth embodiment, the same configurations as those in the above-mentioned embodiments are denoted by the same reference symbols and descriptions thereof are simplified or omitted.

Figure 17:
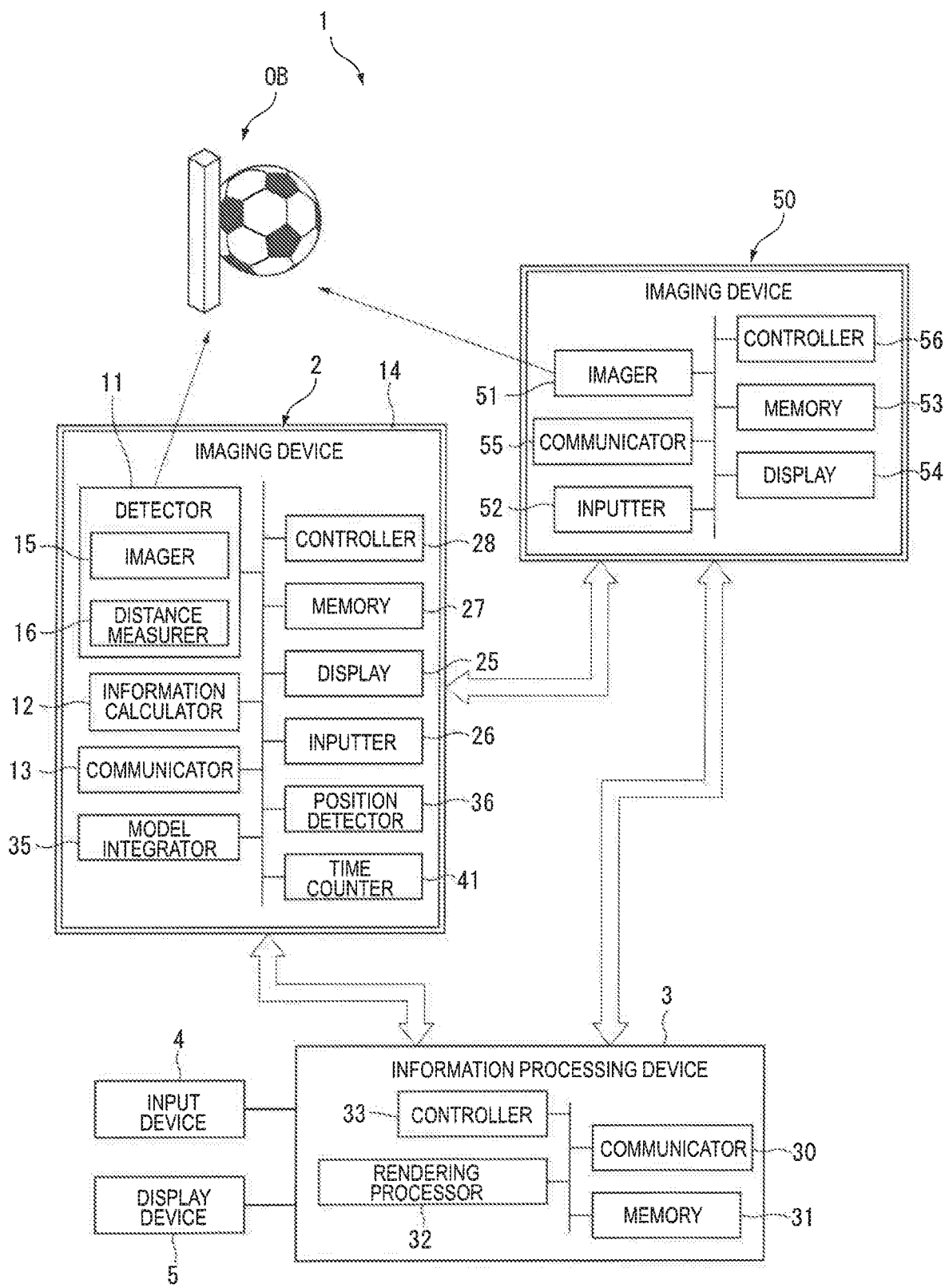
FIG. 17 is a diagram illustrating an operation of an imaging system according to a ninth embodiment.

FIG. 17 is a block diagram illustrating an imaging system 1 according to the ninth embodiment.

In the ninth embodiment, the communicator 13 in the imaging device 2 is capable of receiving image data on an object OB from an external device (for example, an imaging device 50 as a second imaging device).

The imaging device 50 may be a part of the imaging system 1 or may be a device outside the imaging system 1.

The imaging device 50 does not include a distance measurer such as the imaging device 2.

In this case, the imaging device 50 transmits images (parallax images) having a parallax among images taken by the imager 51 to the imaging device 2.

The imaging device 2 uses the received parallax images to calculate depth information on the imaging device 50.

For example, the imaging device 50 does not calculate the above-mentioned model information.

The imaging device 50 is, for example, a general-purpose camera, an advanced mobile phone such as a smartphone, or a tablet.

The imaging device 50 includes, for example, an imager 51, an inputter 52, a memory 53, a display 54, a communicator 55, and a controller 56.

The imager 51 includes, for example, a CCD image sensor or a CMOS image sensor, and is capable of imaging the object OB.

The memory 53 includes, for example, a non-volatile memory, and stores therein data on images taken by the imager 51 and various kinds of setting information.

For example, the inputter 52 receives an instruction from a user.

For example, the display 54 displays the image data stored in the memory 53 or images represented by various kinds of setting information.

The communicator 55 is capable of communicating with the communicator 13 in the imaging device 2 in a wired or wireless manner.

For example, the communicator 55 transmits data on images of the object OB taken by the imager 51 to the communicator 13 in the imaging device 2.

The controller 56 controls each unit in the imaging device 50.

As described in the above-mentioned embodiments, the information calculator 12 in the imaging device 2 uses a detection result of the detector 11 to calculate first model information.

The information calculator 12 in the imaging device 2 calculates second model information on the basis of, for example, images taken by the imager 15 and/or images (image data on the object OB) received from the imaging device 50.

The information calculator 12 is not necessarily required to calculate second model information.

For example, the information calculator 12 may use images received from the imaging device 50 for interpolation processing.

For example, the imaging device 2 may detect first depth information with the distance measurer 16, calculate second depth information on the basis of images taken by the imager 15 and images received from the imaging device 50, and use the second depth information to interpolate the first depth information.

The communicator 55 in the imaging device 50 is capable of communicating with the communicator 30 in the information processing device 3 in a wired or wireless manner.

For example, the communicator 55 transmits rendering processing setting information (for example, viewpoint information on estimated image) to the communicator 30 in the information processing device 3.

For example, the rendering processor 32 in the information processing device 3 performs rendering processing by using the model information received from the communicator 13 in the imaging device 2 and the rendering processing setting information received from the communicator 55 in the imaging device 30.

For example, the communicator 30 in the information processing device 30 transmits estimated image data generated through the rendering processing to the communicator 55 in the imaging device 50.

For example, the display 54 in the imaging device 50 displays an estimated image on the basis of the estimated image data transmitted from the information processing device 30.

The communicator 55 in the imaging device 50 is not necessarily required to communicate with the communicator 30 in the information processing device 3.

For example, the communicator 55 may transmit rendering processing setting information to the communicator 13 in the imaging device 2.

The communicator 13 may transmit setting information received from the communicator 55 in the imaging device 50 to the communicator 30 in the information processing device 3.

The communicator 13 may receive estimated image data representing the result of rendering processing from the communicator 30 in the information processing device 3.

The communicator 13 may transmit the estimated image data received from the communicator 30 in the information processing device 3 to the communicator 55 in the imaging device 50.

The display 54 in the imaging device 50 may display an estimated image on the basis of the estimated image data transmitted from the imaging device 2.

The imaging system 1 or the imaging device 2 in each of the above-mentioned embodiments may be a part of a production system or a production support system for video contents including CG, or may be at least a part of a visualization imaging system for blood vessels and biological tissues, a biological microscope system, a defect detection system, or an object measurement system.

For example, the imaging system 1 or the imaging device 2 may be at least a part of a detection system that detects the entry of objects and animals into an area of field of view or the movement of objects and animals in the area of field of view.

For example, the detection system may be a security system, a nursing system, a monitoring system, a signal traffic system, or an information acquisition system that acquires statistical data such as traffic.

The imaging system 1 or the imaging device 2 may be at least a part of a simulator.

For example, the simulator may generate an estimated image in which objects (for example, furniture) and animals (for example, human or pet) are arranged in a space (for example, room) modeled by the imaging device 2.

The simulator may generate an estimated image in which objects and animals modeled by the imaging device 2 are arranged in a predetermined space (for example, room).

According to each of the above-mentioned embodiments, the imaging system in the present embodiment may include: a first imaging device (2, 2*a*) including: a first detector including a first imager that images an object and a first distance measurer that detects a distance from each point on a surface of the object; and a first information calculator that uses a detection result of the first detector to calculate first model information including at least one of shape information or texture information on the object, and uses the first model information to generate first feature point data; a second imaging device (2, 2*b*) including: a second detector including a second imager that images the object and a second distance measurer that detects a distance from each point on the surface of the object; and a second information calculator that uses a detection result of the second detector to calculate second model information including at least one of shape information or texture information on the object, and uses the second model information to generate second feature point data; and a model integrator (35, 45) that uses the first feature point data and the second feature point data obtained by data communication between the first imaging device and the second imaging device to integrate first model information and second model information and generate integrated model information on the object.

In the case of such a configuration, the model integrator may be provided to at least one of the first imaging device, the second imaging device, or the information processing device, or may be provided to another external terminal (model integration processing device).

The technical scope of the present invention is not limited to the above-mentioned embodiments and modifications.

For example, at least one of the elements described in the above-mentioned embodiments and modifications are sometimes omitted.

The elements described in the above-mentioned embodiments and modifications can be combined as appropriate.

The number of imaging devices included in the imaging system 1 may be three or more.

For example, the imaging system 1 may include four imaging devices, two of which may include model integrators and the remaining two of which do not need to include a model integrator.

For example, an imaging device including a model integrator may receive model information from an imaging device that does not include a model integrator to perform model integration.

In this case, first integrated model information and second integrated model information may be calculated, and the information processing device 3 may integrate the first integrated model information and the second integrated model information.

The imaging device in the embodiments may be a wearable terminal, and a mount that can be mounted on the arm or head and an inputter used for voice input, button input, and touch operation may be provided to the main body of the imaging device.

DESCRIPTION OF REFERENCE SIGNS 1 imaging system, 2 imaging device, 3 information processing device, 11 detector, 12 information calculator, 13 communicator, 15 imager, 16 distance measurer, 18 image sensor, 19 irradiator, 21 image sensor, 35 model integrator, OB object

What is claimed is:

1. An imaging system, comprising:
a first imaging device, a second imaging device, and an information processing device, wherein
the first imaging device includes:
  a first main body including:
    a first detector including a first imager that images an object and a first distance measurer that detects a first distance from each point on a surface of the object to the first distance measurer;
    a first information calculator that uses a detection result of the first detector to calculate first model information including shape information and texture information on the object; and
    a first communicator that transmits the first model information to the information processing device;
the second imaging device includes:
  a second main body including:
    a second detector including a second imager that images the object and a second distance measurer that detects a second distance from each point on the surface of the object to the second distance measurer;
    a second information calculator that uses a detection result of the second detector to calculate second model information including shape information and texture information on the object; and
    a second communicator that transmits the second model information to the information processing device; and
the information processing device is provided external to the first imaging device and the second imaging device, and includes a model integrator that integrates the first model information and the second model information to generate integrated model information on the object.

2. An imaging system, comprising:
a first imaging device, a second imaging device, and a model integrator, wherein
the first imaging device includes:
  a first main body including:
    a first detector including a first imager that images an object and a first distance measurer that detects a first distance from each point on a surface of the object to the first distance measurer;
    a first information calculator that uses a detection result of the first detector to calculate first model information including shape information and texture information on the object, and uses the first model information to generate first feature point data;
    a first communicator that transmits the first feature point data to the model integrator;
the second imaging device includes:
  a second main body including:
    a second detector including a second imager that images the object and a second distance measurer that detects a second distance from each point on a surface of the object to the second distance measurer;
    a second information calculator that uses a detection result of the second detector to calculate second model information including shape information and texture information on the object, and uses the second model information to calculate second feature point data; and
    a second communicator that transmits the second feature point data to the model integrator; and
the model integrator is provided external to the first imaging device and the second imaging device, and uses the first feature point data and the second feature point data that are obtained by data communication between the first imaging device and the second imaging device to integrate the first model information and the second model information and generate integrated model information on the object.

3. The imaging system according to claim 2, comprising an information processing device including the model integrator.

* * * * *